Figure 1:
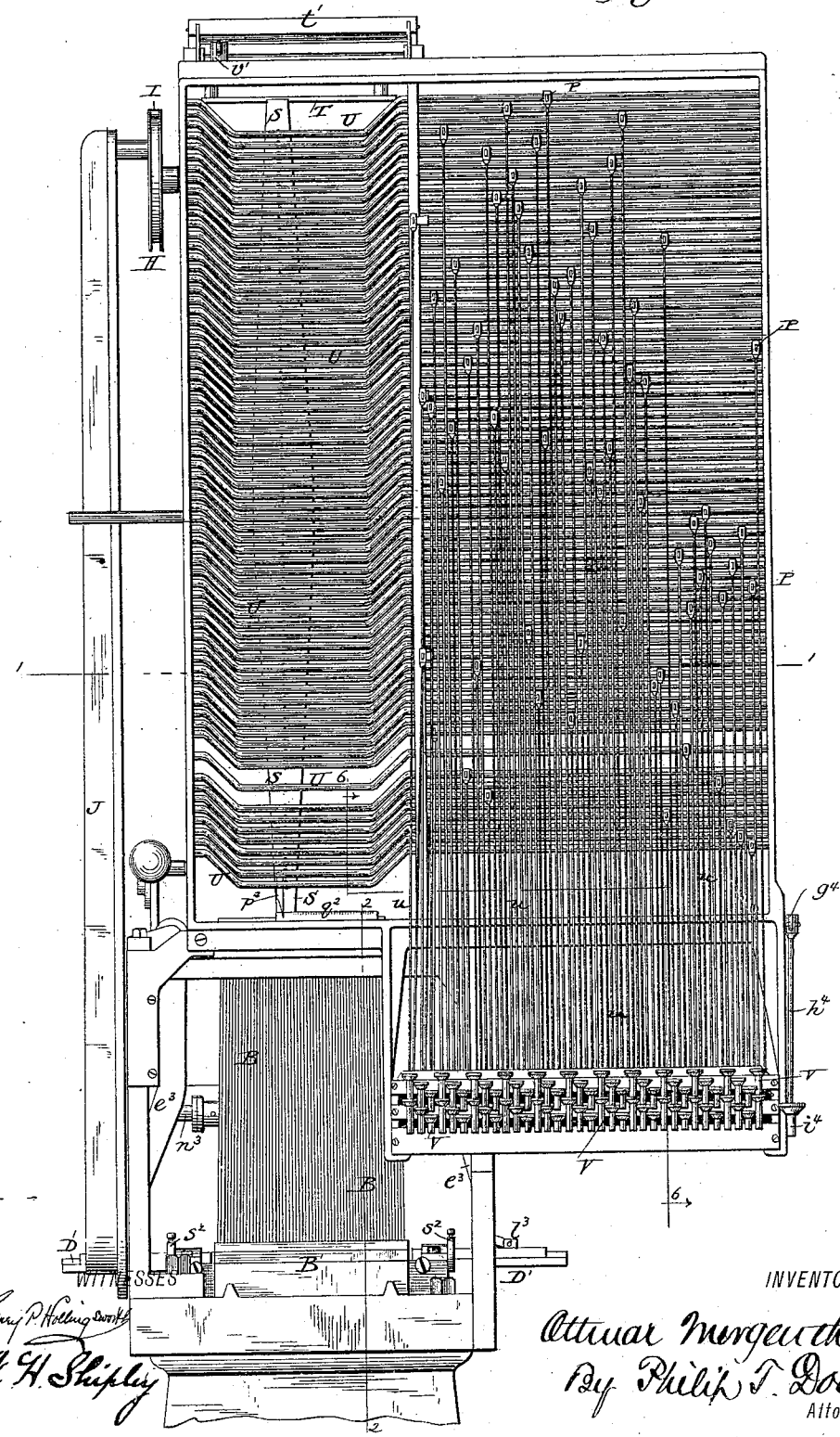

(No Model.) 14 Sheets—Sheet 1.

O. MERGENTHALER.
MACHINE FOR PRODUCING STEREOTYPE MATRICES.

No. 312,145. Patented Feb. 10, 1885.

WITNESSES
Henry P. Hollingsworth
W. H. Shipley

INVENTOR
Ottmar Mergenthaler
By Philip T. Dodge
Attorney (No Model.) 14 Sheets—Sheet 2.

O. MERGENTHALER.
MACHINE FOR PRODUCING STEREOTYPE MATRICES.

No. 312,145. Patented Feb. 10, 1885.

WITNESSES
Sidney P. Hollingsworth
W. H. Shipley

INVENTOR
Ottmar Mergenthaler
By Philip T. Dodge,
Attorney

N. PETERS, Photo-Lithographer, Washington, D. C.

(No Model.) 14 Sheets—Sheet 3.
O. MERGENTHALER.
MACHINE FOR PRODUCING STEREOTYPE MATRICES.
No. 312,145. Patented Feb. 10, 1885.
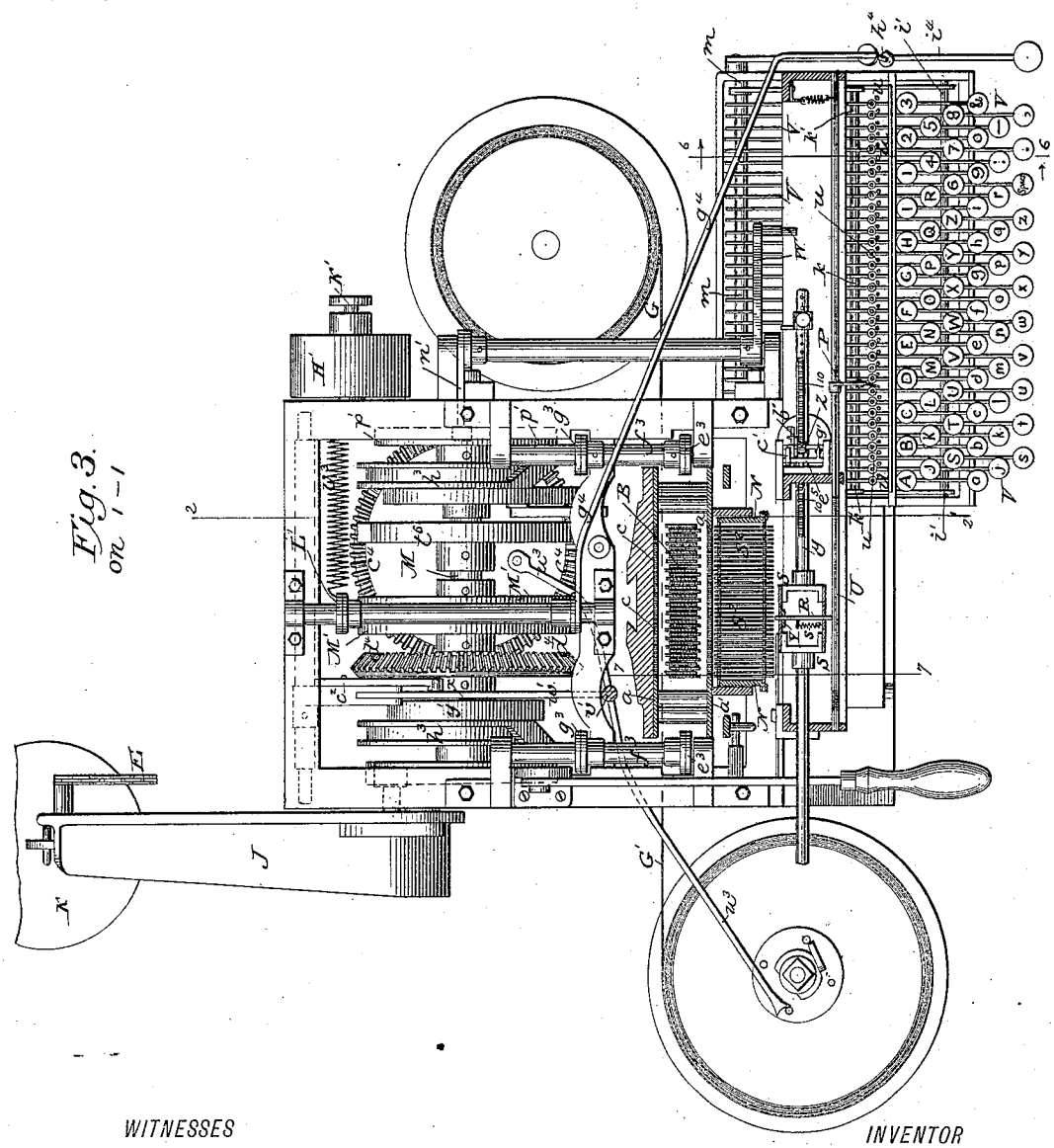
WITNESSES
Sidney P. Hollingsworth
W. H. Shipley
INVENTOR
Ottmar Mergenthaler
By Philip T. Dodge.
Attorney

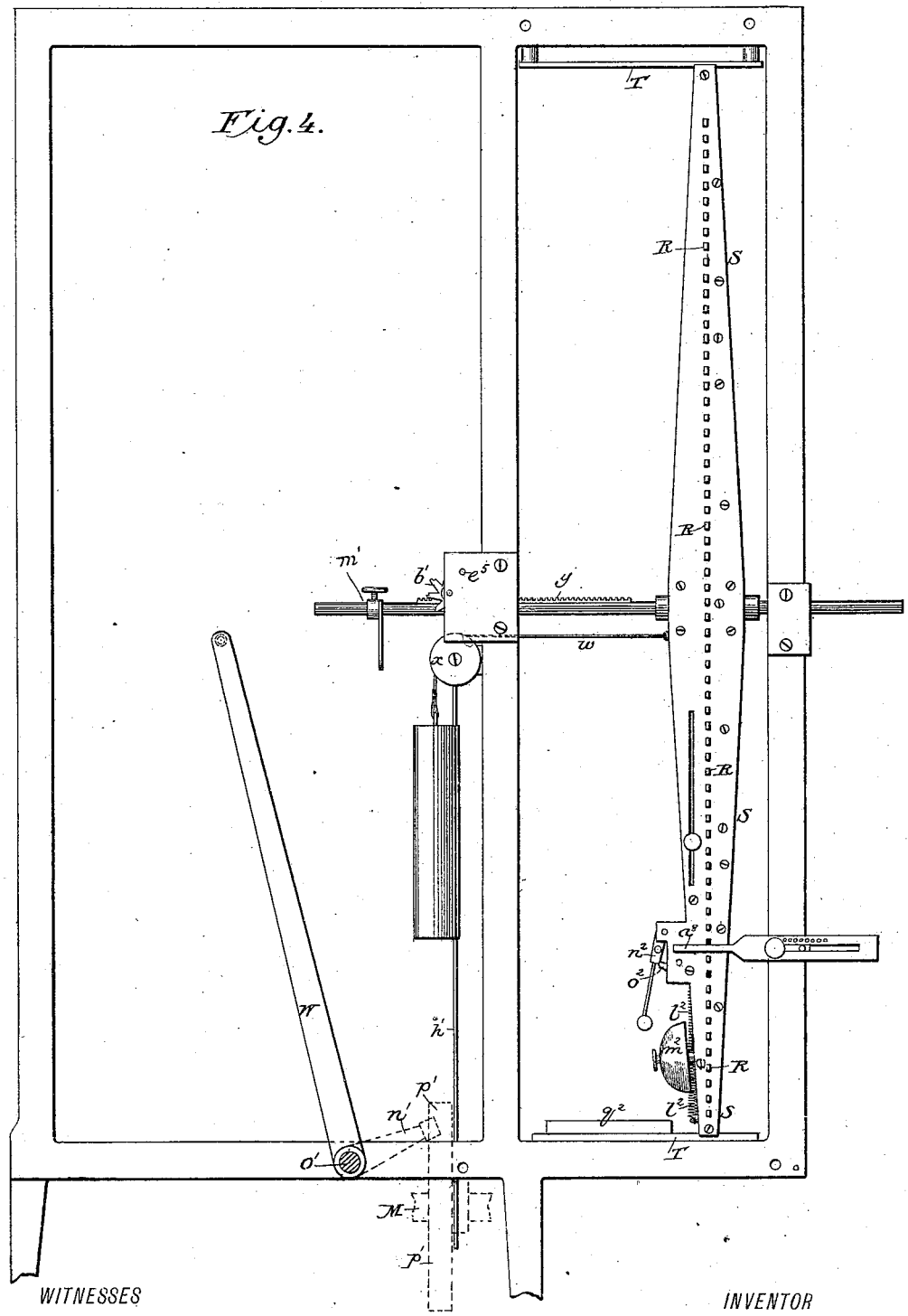

(No Model.) 14 Sheets—Sheet 5.
O. MERGENTHALER.
MACHINE FOR PRODUCING STEREOTYPE MATRICES.
No. 312,145. Patented Feb. 10, 1885.
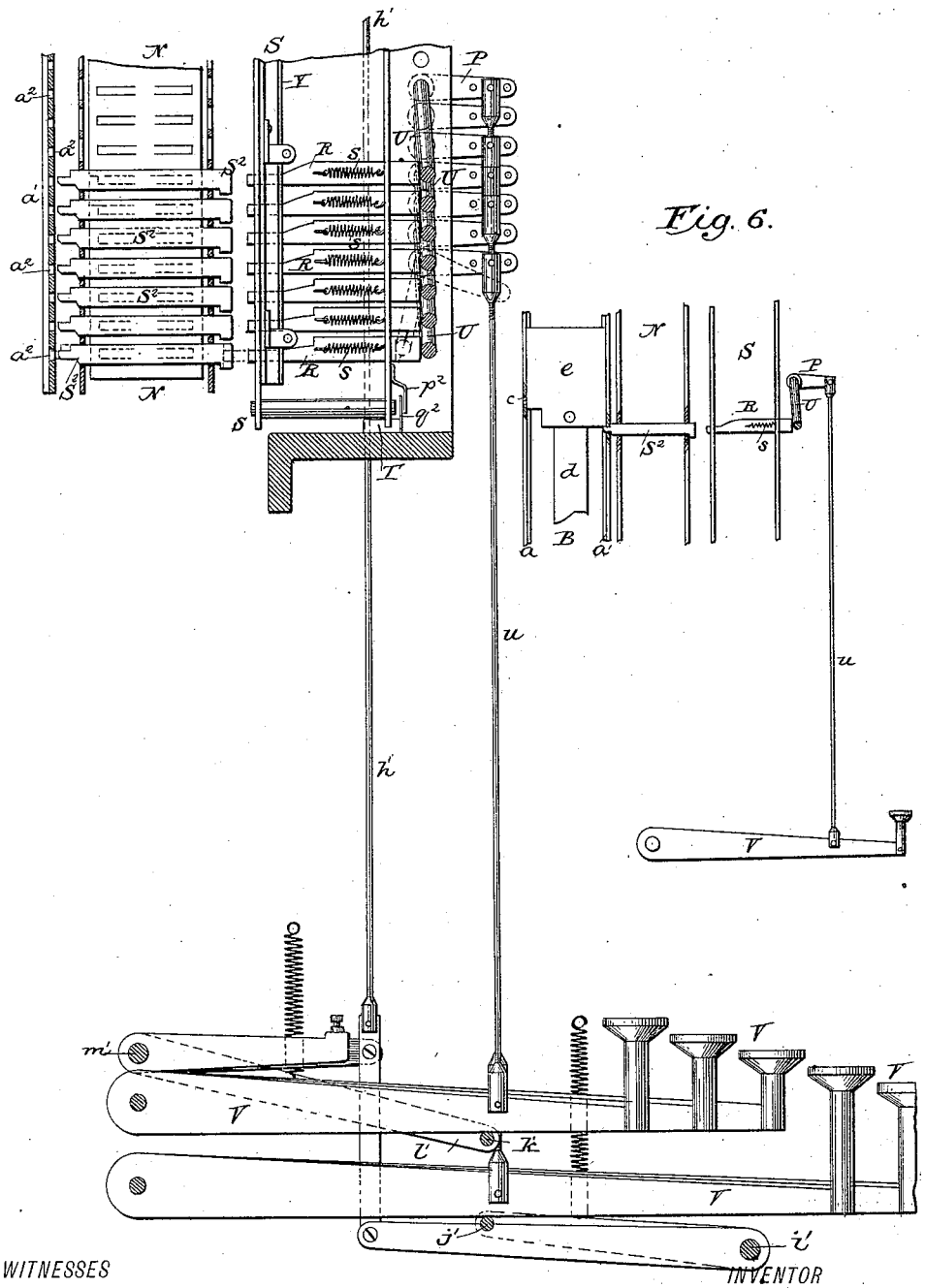
WITNESSES
INVENTOR
Ottmar Mergenthaler
By Philip T. Dodge
Attorney (No Model.) 14 Sheets—Sheet 6.
O. MERGENTHALER.
MACHINE FOR PRODUCING STEREOTYPE MATRICES.
No. 312,145. Patented Feb. 10, 1885.
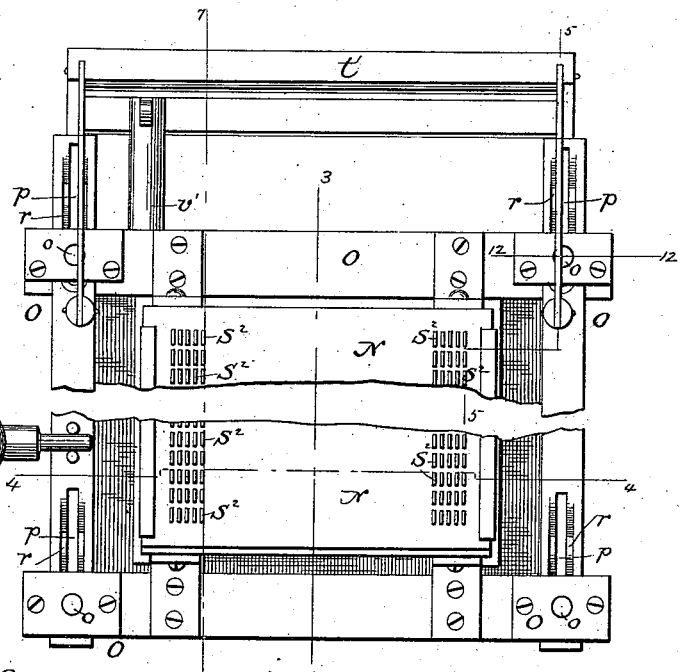

(No Model.) 14 Sheets—Sheet 7.
O. MERGENTHALER.
MACHINE FOR PRODUCING STEREOTYPE MATRICES.
No. 312,145. Patented Feb. 10, 1885.
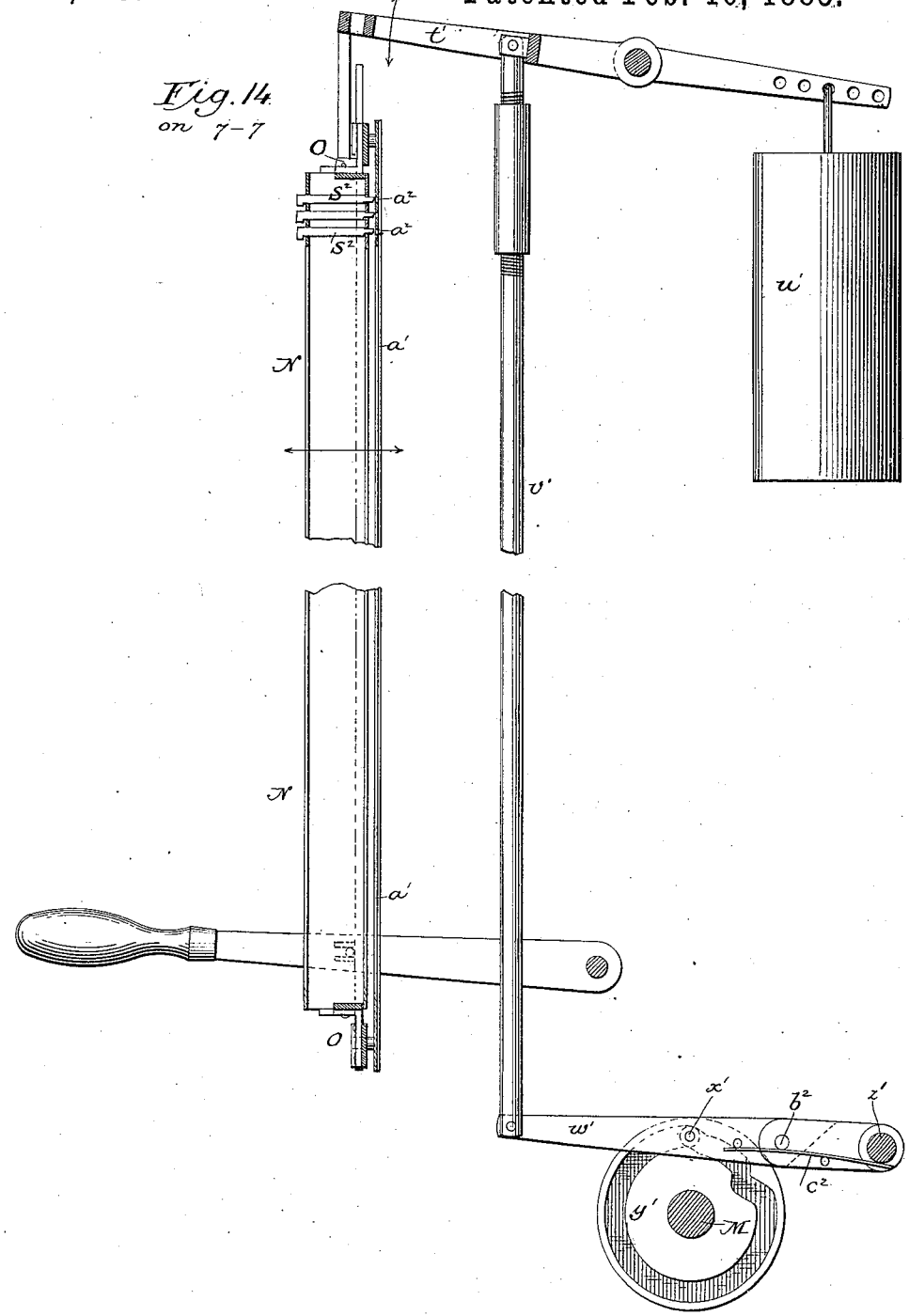
Fig. 14 on 7—7
WITNESSES
INVENTOR
Ottmar Mergenthaler
By Philip T. Dodge.
Attorney (No Model.) 14 Sheets—Sheet 8.
O. MERGENTHALER.
MACHINE FOR PRODUCING STEREOTYPE MATRICES.
No. 312,145. Patented Feb. 10, 1885.
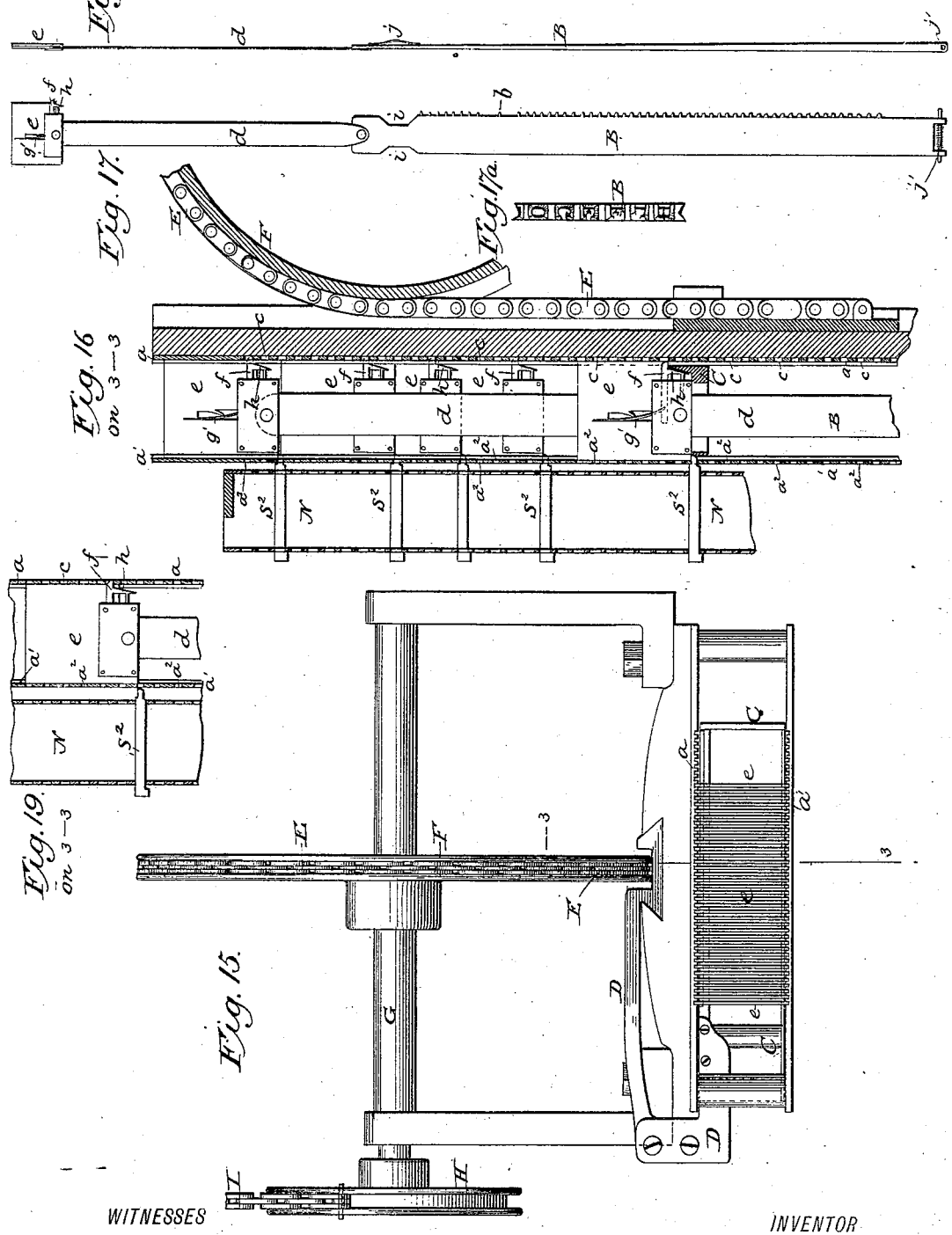
WITNESSES
INVENTOR
Ottmar Mergenthaler
By Philip T. Dodge
Attorney (No Model.) 14 Sheets—Sheet 9.
O. MERGENTHALER.
MACHINE FOR PRODUCING STEREOTYPE MATRICES.
No. 312,145. Patented Feb. 10, 1885.
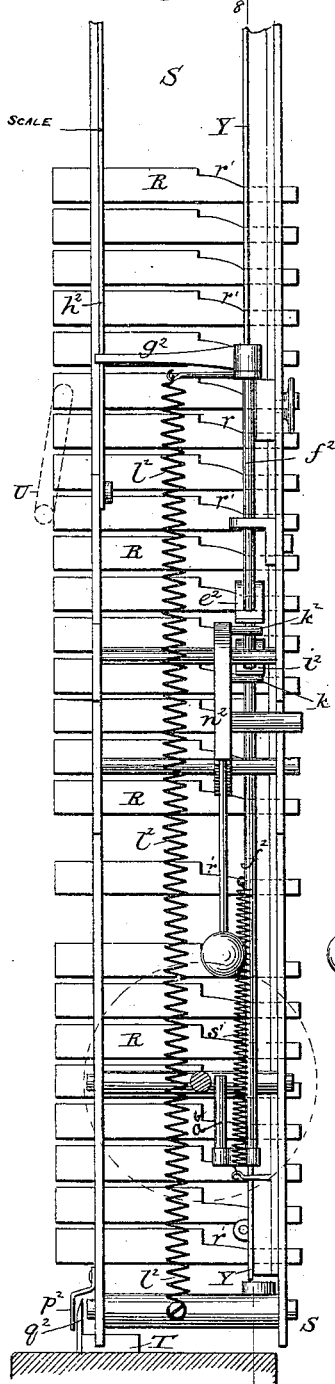
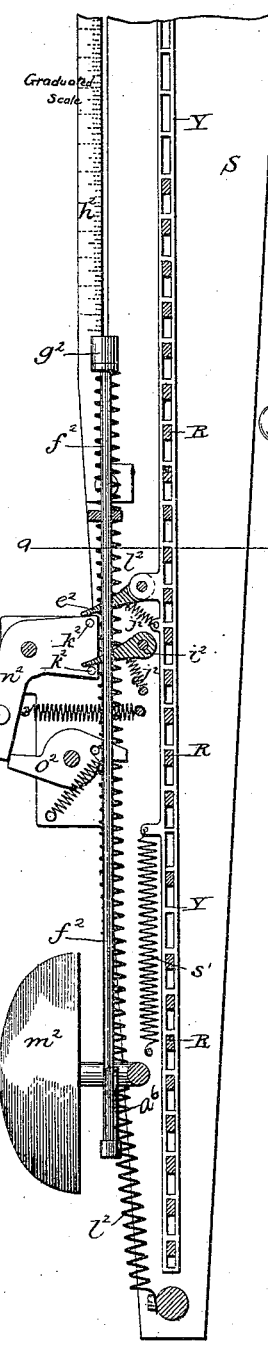
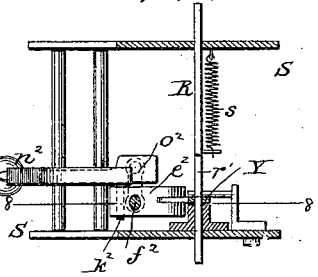
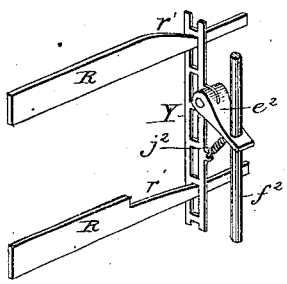
WITNESSES
Sidney P. Hollingsworth
W. H. Shipley
INVENTOR
Ottmar Mergenthaler
By Philip T. Dodge
Attorney (No Model.)  14 Sheets—Sheet 10.
O. MERGENTHALER.
MACHINE FOR PRODUCING STEREOTYPE MATRICES.
No. 312,145.  Patented Feb. 10, 1885.
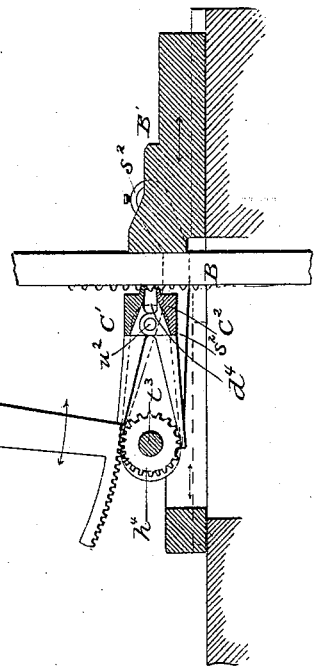
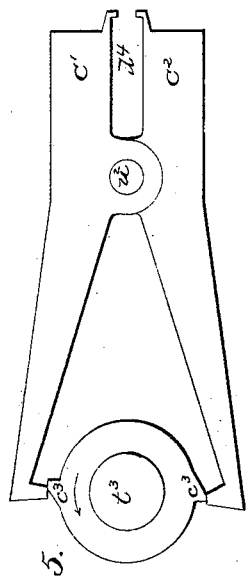
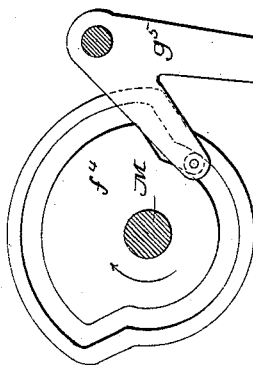
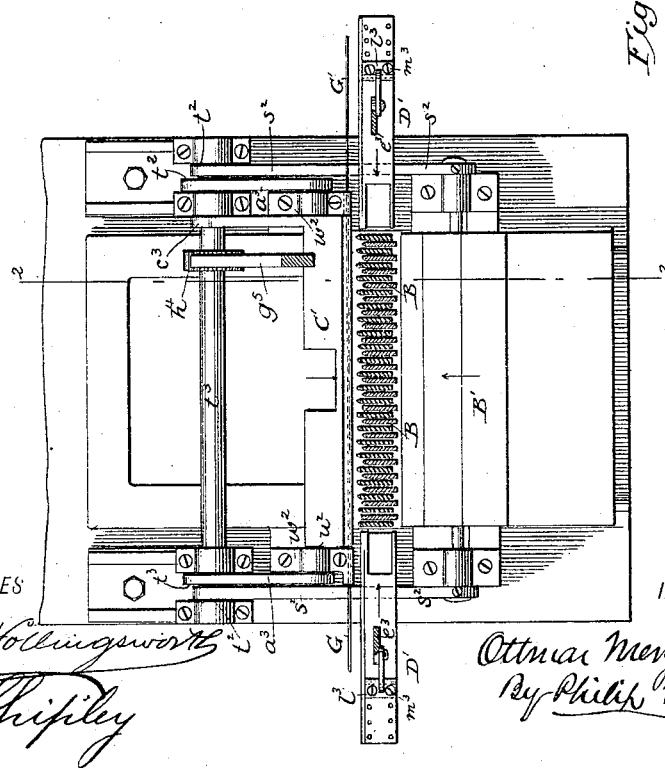
WITNESSES  INVENTOR
Sidney P. Hollingsworth  Ottmar Mergenthaler
W. H. Shipley  By Philip T. Dodge
  Attorney (No Model.) 14 Sheets—Sheet 11.
O. MERGENTHALER.
MACHINE FOR PRODUCING STEREOTYPE MATRICES.
No. 312,145. Patented Feb. 10, 1885.
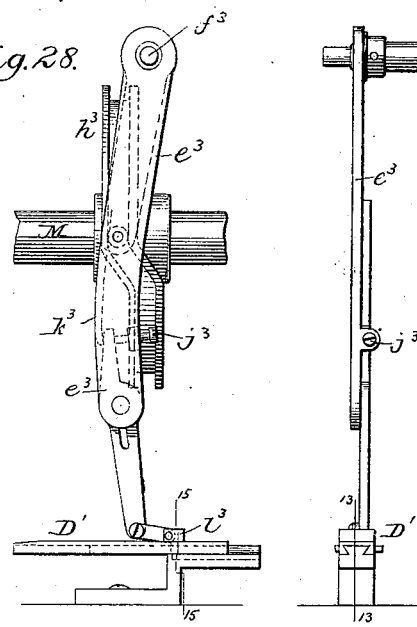
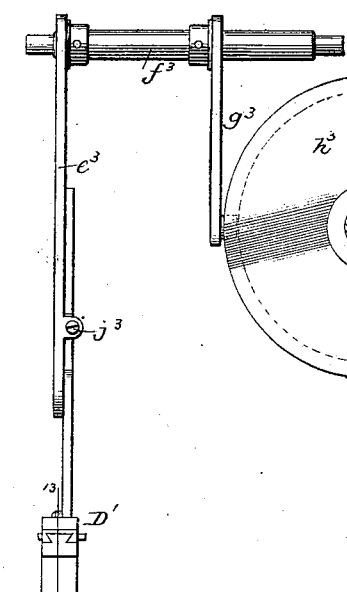
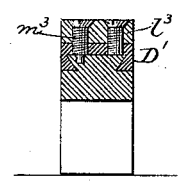
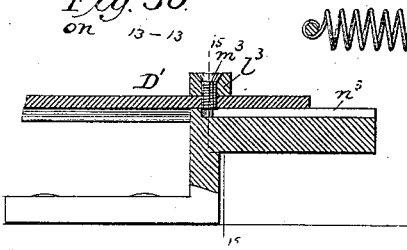
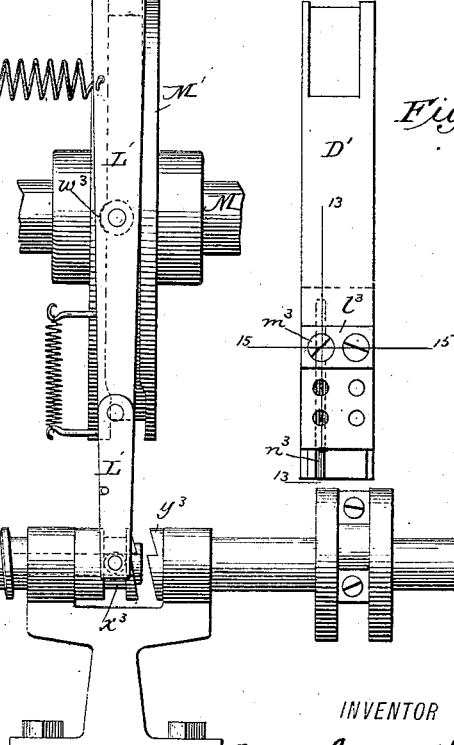
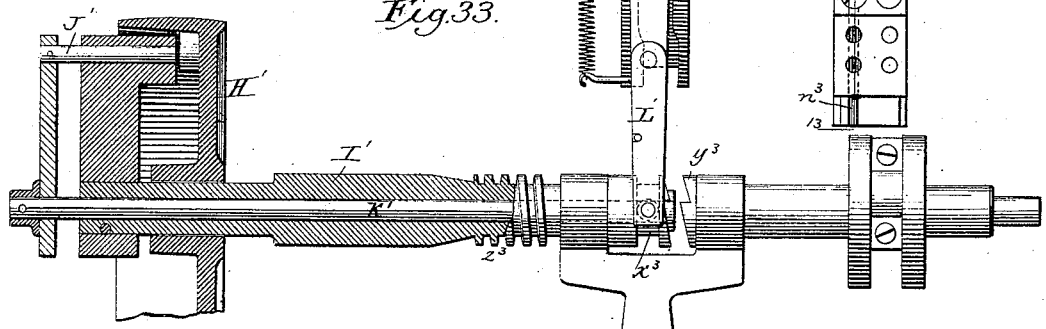
WITNESSES
INVENTOR
Ottmar Mergenthaler
By Philip T. Dodge
Attorney (No Model.) 14 Sheets—Sheet 12.

O. MERGENTHALER.
MACHINE FOR PRODUCING STEREOTYPE MATRICES.

No. 312,145. Patented Feb. 10, 1885.

WITNESSES
Sidney P. Hollingsworth
W. H. Shipley

INVENTOR
Ottmar Mergenthaler
By Philip T. Dodge.
Attorney (No Model.) 14 Sheets—Sheet 13.

O. MERGENTHALER.

MACHINE FOR PRODUCING STEREOTYPE MATRICES.

No. 312,145. Patented Feb. 10, 1885.

WITNESSES
Sidney P. Hollingsworth
W. H. Shipley

INVENTOR
Ottmar Mergenthaler
By Philip T. Dodge
Attorney (No Model.) 14 Sheets—Sheet 14.
O. MERGENTHALER.
MACHINE FOR PRODUCING STEREOTYPE MATRICES.
No. 312,145. Patented Feb. 10, 1885.
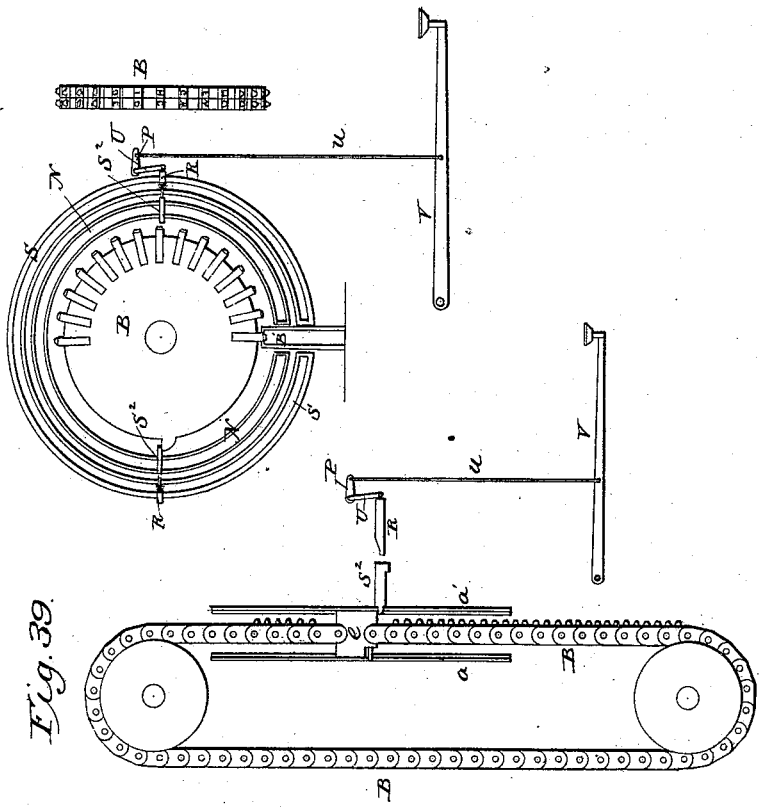
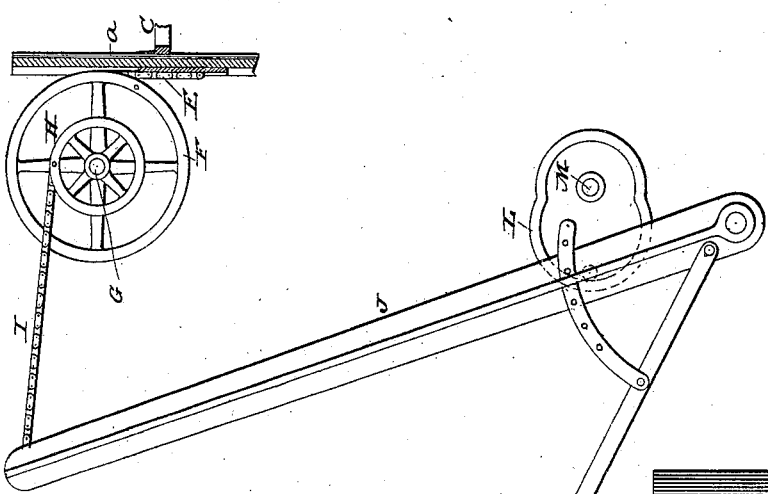
WITNESSES
Sidney P. Hollingsworth
W. H. Shipley
INVENTOR
Ottmar Mergenthaler
By Philip T. Dodge.
Attorney

United States Patent Office.

OTTMAR MERGENTHALER, OF BALTIMORE, MARYLAND, ASSIGNOR TO THE NATIONAL TYPOGRAPHIC COMPANY, OF WASHINGTON, D. C.

MACHINE FOR PRODUCING STEREOTYPE-MATRICES.

SPECIFICATION forming part of Letters Patent No. 312,145, dated February 10, 1885.

Application filed July 9, 1884. (No model.)

*To all whom it may concern:*

Be it known that I, OTTMAR MERGENTHALER, of Baltimore city, in the State of Maryland, have invented certain Improvements in Machines for Producing Stereotype-Matrices, &c., of which the following is a specification.

The aim of this invention is to provide an improved machine adapted to be actuated by a suitable motor and controlled by finger-keys for producing line-matrices for stereotype-plates.

It is the especial aim of the invention to produce an improved machine by which the impressions may be formed a line at a time, with the characters in accurate alignment, properly spaced or justified, and of uniform depth, to the end that the characters in the resulting casting may be identical with and in all respects equal to the ordinary movable type.

My machine embraces several distinct groups or combinations of devices which, although they co-operate to the final or unitary result, are to a certain extent independent of each other.

In order that the detailed description hereinafter given may be the better understood, I will first explain the general character and mode of action of these groups or sub-combinations of devices.

As the basis of my organization, I provide a series of long bars, chains, or equivalent supporting devices, denominated, for convenience of reference, "type-bars," which are duplicates of each other, and each of which has fixed or formed on one of its edges all the different characters or letters which the machine is designed to indent. These bars I arrange side by side in an upright position so that they may rise and fall independently. By raising and lowering the respective bars I am enabled to bring into one horizontal line all the characters which are to be printed at one time. For example, if the word "the" is to be produced, the first bar is lowered until its letter "t" reaches the impression-point, the second bar lowered until its letter "h" is in line with the letter "t" of the first bar, the third bar lowered in like manner until its letter "e" is in line with the other selected characters, and so on repeatedly through the series until all the bars are adjusted with their selected letters in a common horizontal line at the impression or printing point. The result is a line of letters or type representing a number of words in the order or sequence in which they are to be read. Clamping devices are provided for locking the bars after they are adjusted firmly in place, and while they are thus locked hammering or beating devices act to beat the paper or other substances into or upon the line of characters, in order to take an impression therefrom, and thus form the matrix. The impression is formed and the bars raised to their normal position. During the time of the impression and the restoration of the bars the keys are manipulated to select the letters and set the stop devices for the next line.

For reasons which will hereinafter appear, the bars are tapered laterally from one end to another, and have the type or letters arranged upon their edge in the order of their width, each type being of substantially the same width as the edge of the bar at the particular point where it is located.

In order to arrest the various bars at the proper points to present the selected letters in the printing position, I employ, in connection with the finger-keys, a system of stop devices, which will now be explained. In front of the type bars there is a frame containing a large number of horizontal pins, denominated "stop-pins," which are free to slide forward and backward, and the office of which is to arrest the descent of the respective bars at such points as to stop and hold the selected letters at the impression-point. These stop-pins are arranged in vertical rows in front of the respective bars, each row containing as many pins as there are letters or characters in the corresponding bar. In their normal or forward positions these pins permit the bars to descend their entire length without hinderance; but whenever a pin is pushed back its rear end is projected into the path traversed by the head of the corresponding type-bar as the latter descends, and consequently the pin, encountering the head, stops the bar at the required point. It is to be understood that each type-bar is combined with its own series of stop-pins, and that each pin represents a particular character or letter on the bar—that is to say, it will stop the bar in position to indent a particular letter. Each bar will stop at one point or another, and consequently present one letter or another for action, according as one or another of its stop-pins is actuated.

In order to adjust the stop-pins of the respective printing-bars in succession, and the particular pin of each bar required to cause the indenting of the selected letter, I employ in front of the frame containing the stop-pins a second series of horizontal stop-pins, denominated, for convenience of reference, "adjusting-pins," which are in turn actuated through intermediate devices by a series of finger-keys, each of which represents a letter or character. Each key is actuated with and serves to turn a horizontal crank-shaft extending across the front of the main frame. These shafts are arranged one above another directly in front of the adjusting-pins, so that the rotation of either shaft will cause a backward movement of a corresponding adjusting-pin, which latter will in turn force backward the particular stop-pin which may chance at the moment to be behind it. The adjusting-pins are sustained in an upright frame lying between the crank-shafts and the frame which carries the stop-pins, and movable horizontally from left to right. The adjusting-pins are arranged in a vertical row, and their movable frame is connected with the finger-keys and with an automatic feed mechanism in such manner that it is moved to the right step by step, so as to present the adjusting-pins in front of the stop-pins of the various printing-bars in succession.

At the beginning of the operation the frame presents the entire series of adjusting-pins one above another directly in front of the first printing-bar. The depression of the first key, whatever its letter, causes the corresponding adjusting-pin to push back the appropriate stop-pin to arrest the first printing-bar at the required point. As the key rises automatic devices move the frame to the right until the adjusting-pins stand in front of the stop-pins of the second printing-bar, so that the action of the next key causes the appropriate adjusting-pin to move back the appropriate stop-pin to arrest the second printing-bar, after which the frame again advances to the right to present the adjusting-pins in front of the third bar, and so on repeatedly, the frame advancing as successive keys are actuated, so as to present the adjusting-pins in front of one printing-bar after another throughout the series. After the stop-pins have thus been adjusted to arrest all the bars in the series, or such as are to print at one time, the frame carrying the adjusting-pins moves quickly to the left to its normal position preparatory to the designation and adjustment of the bars for the next impression.

In order to increase the speed and capacity of the machine by enabling the operator to actuate the keys and set the stops for printing a second line while the impression is being taken from the preceding line—that is to say, while the printing-bars remain in their previously-adjusted positions—I provide the heads of the type-bars with detents or dogs, which automatically engage a stationary plate, so as to hold the bar suspended at the proper point independently of the stop-pin after the latter has acted to arrest its descent. The bars being thus sustained, automatic devices provided for the purpose move the frame containing the stop-pins in such manner as to restore them to their normal positions and disconnect them from the printing-bars previous to or during the impression. This disconnection being accomplished, the keys may be again actuated and the stop pins adjusted while the impression is being made, so that the instant that one impression is completed the bars may be instantly readjusted preparatory to the taking of the next impression. Thus it will be seen the two operations of taking one impression and preparing for another may be carried on simultaneously and independently.

In order to enable the attendant to perceive at any instant the space remaining to be filled in a line of characters, I combine with the mechanism an indicator, and also, if required, an alarm, as hereinafter fully explained. I also provide the machine with automatic spacing devices to fill the blank spaces which may occur where blanks are to be formed in the matrix—in other words, the space between two or more printing-bars which are separated from each other when the intervening bar is not used to print.

My invention also embraces many other devices and combinations of devices of secondary importance, which will be hereinafter more fully explained, and pointed out in the claims.

Figure 2:
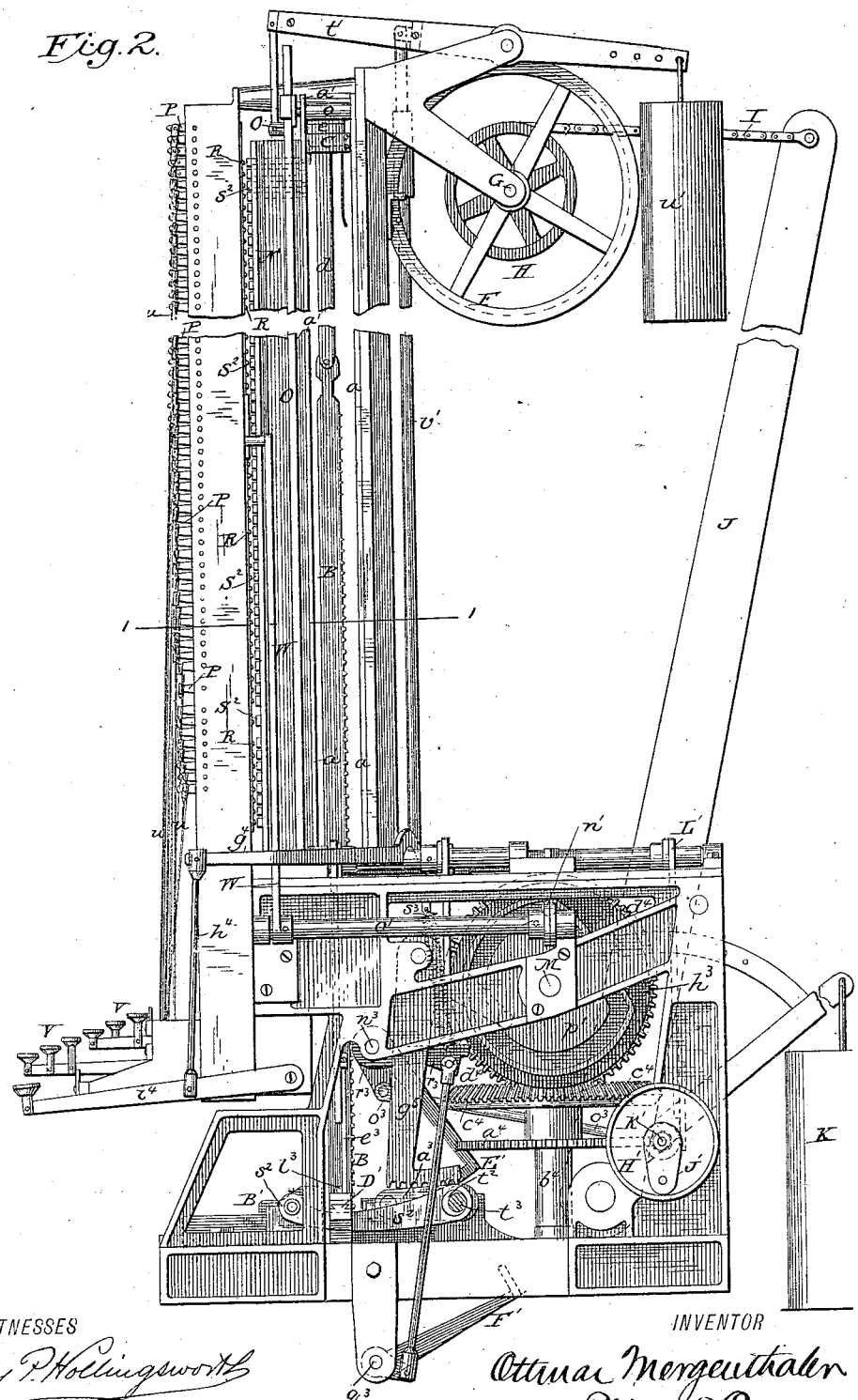
Figure 34:
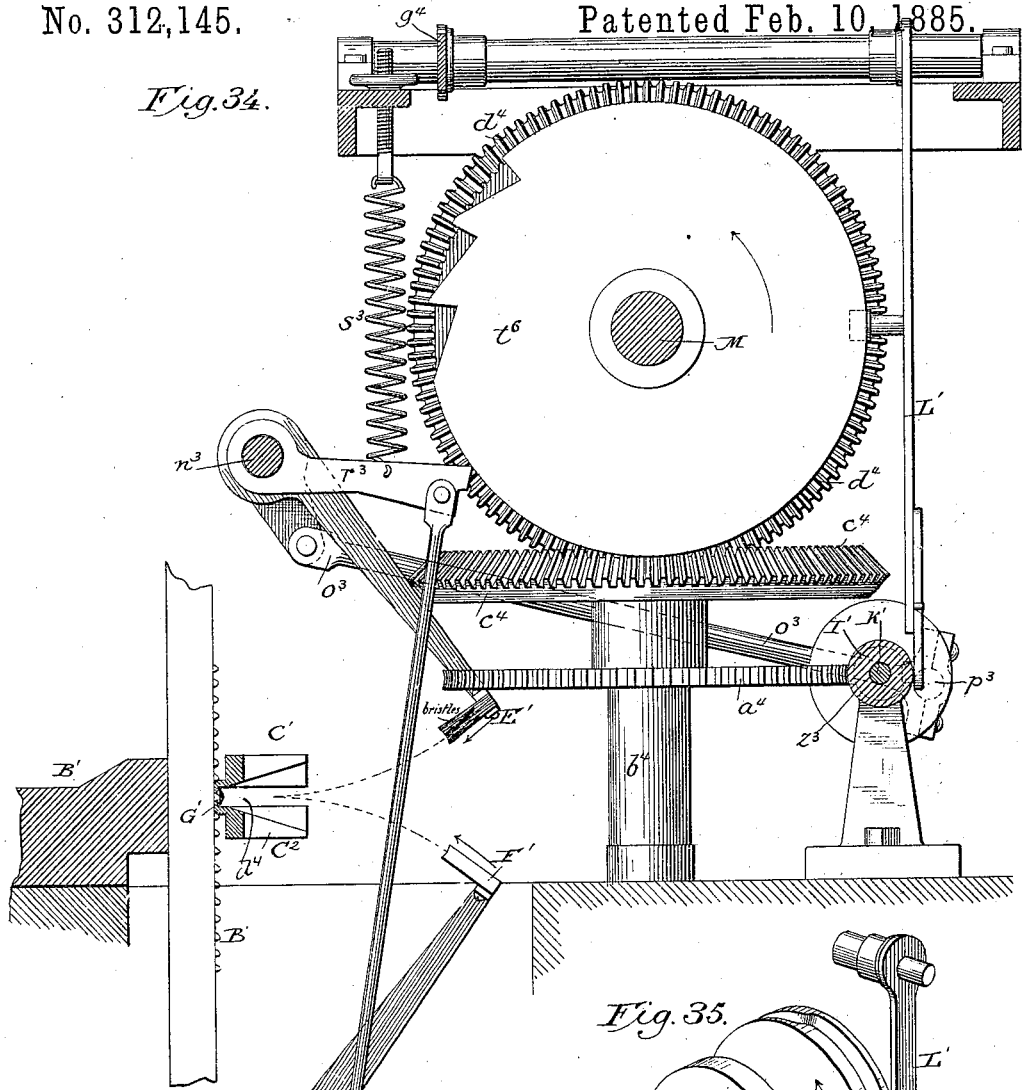
Figure 35:
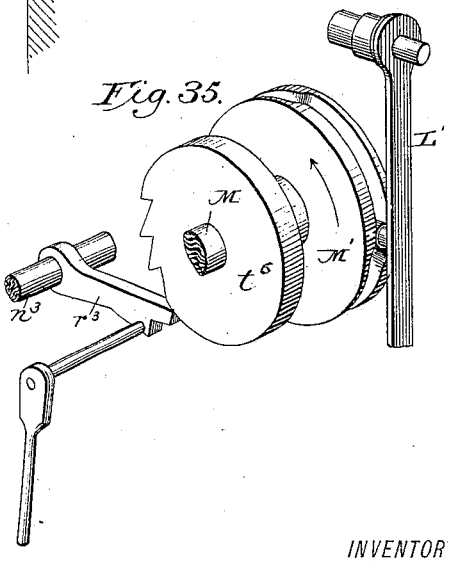
Figure 36:
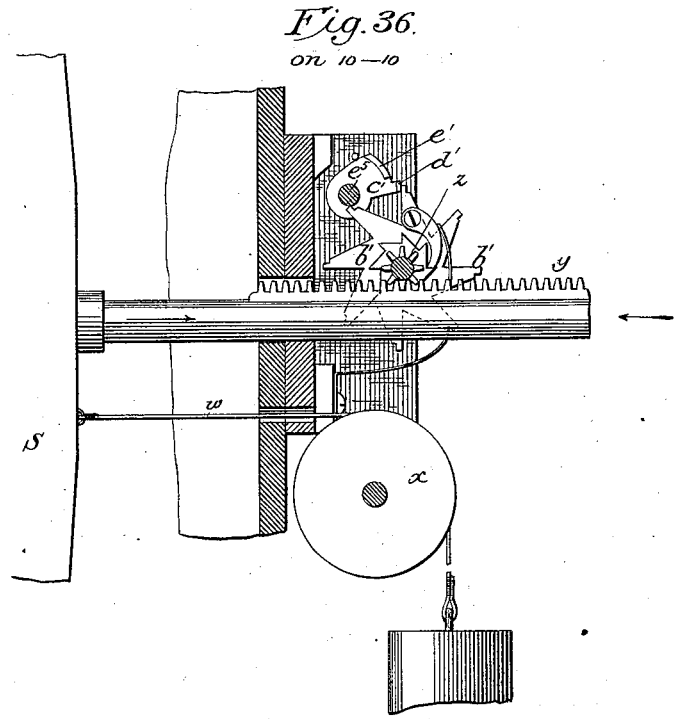
Figure 37:
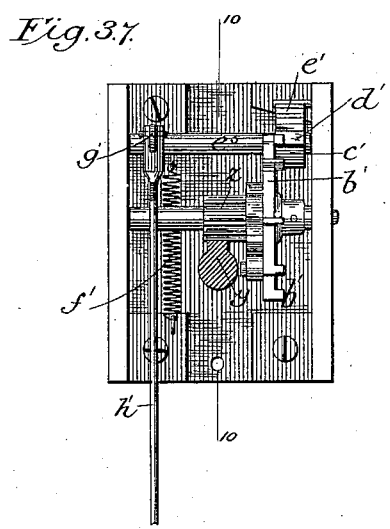

Figure 1 represents a front elevation of my machine. Fig. 2 is a side elevation of the same. Fig. 3 is a horizontal section on the line 1 1 of Figs. 1 and 2, looking in a downward direction. Fig. 4 is a rear elevation of the main frame, the crank-shaft and other parts being removed. Fig. 5 is a vertical section through the lower part of the machine, on the line 6 6 of Figs. 1 and 3, in the direction indicated by the arrow. Fig. 6 is a section on the same line as the preceding, representing the parts in the upper part of said figure in different positions. Fig. 7 is a front elevation of a portion of the main frame and the parts mounted therein, illustrating particularly the arrangement of the sliding pins through which connection is made from the finger-keys to the type-bars. Fig. 8 is a horizontal cross-section on the line 4 4 of the preceding figure. Fig. 9 is a vertical section on the line 5 5 of Fig. 7, showing one of the cams by which the pin-frame is advanced and retracted. Figs. 10, 11, and 12 are similar views showing the parts in different positions. Fig. 13 is a horizontal section on the line 12 12 of Figs. 7, 9, 10, 11, and 12. Fig. 14 is a vertical cross-section through the pin-frame, from front to rear, on the line 7 7 of Figs. 3, 7, and 8. Fig. 15 is a top plan view showing the main frame and the frame in which the type bars or slides are mounted. Fig. 16 is a vertical cross-section through the same from front to rear on the line 3 3. Fig. 17 is a side elevation of one of the type-bars and its suspending link and head. Fig. 18 is an edge view of the same. Fig. 19 is a vertical section on the line 3 3 of Fig. 15, showing the head by which one of the type bars is suspended and the devices operating in connection therewith. Fig. 20 is a side elevation of the index and alarm mechanism by which the operator is notified of the space remaining at the end of a line. Fig. 21 is a vertical section through the same on the line 8 8 of the preceding figure. Fig. 22 is a horizontal section of the same on the line 9 9. Fig. 23 is a perspective view illustrating more fully the action of the devices represented in the three preceding figures. Fig. 24 is a top plan view of the base-frame, with the type-bars and clamping devices shown in horizontal section above the same, various attendant parts being removed to expose others to view. Fig. 25 is a side elevation of the jaws for clamping the type from above or below, together with the cam for actuating the same. Fig. 26 is a vertical section from front to rear on the line 2 2 of Fig. 24, showing more fully the devices for clamping the type-bars in position. Fig. 27 is a horizontal section through a number of the type-bars and the clamp for confining the same at one side. Fig. 28 is a front elevation of one of the clamps for applying lateral pressure to the type-bar, together with the cam mechanism for actuating the same. Fig. 29 is a side elevation of the same. Fig. 30 is a section on the line 13 13 of Fig. 29, showing the devices by which the motion of the clamp is limited. Fig. 31 is a cross-section on the line 15 15 of Figs. 28 and 30. Fig. 32 is a top plan view of the clamp shown in Figs. 28 and 30. Fig. 33 is a rear elevation of the clutch mechanism through which motion is imparted to the machine, a portion of the same being shown in section at one end. Fig. 34 is a vertical section through the base of the machine, from front to rear, on the line 2 2 of Figs. 1, 3, and 24, showing particularly the beaters by which the paper or other material is forced upon the type. Fig. 35 is a perspective view of the clutch-controlling mechanism. Fig. 36 is a vertical cross-section on the line 10 10 of Figs. 3 and 37, showing the devices by which the pin-frame represented in Fig. 4 is moved laterally. Fig. 37 is a side view of the parts represented in the preceding figure, viewed in the direction indicated by the arrow. Fig. 38 is a side elevation, partly in section, illustrating the weighted lever, its operating-cam, and the intermediate connections through which the raising and lowering of the series of type-bars is effected. Figs. 39 and 40 are outline views illustrating the manner in which my finger-key connections for designating the characters may be used in connection with type-bearing chains and type-bearing wheels or disks, respectively.

*Main frame.*—I provide a rigid upright frame of the form shown or any other suitable form adapted to give support to the details hereinafter described, and mounted on legs or other supports. In the upright part of this frame I fix two vertical parallel plates, $a\ a'$, separated, usually, from one to two inches, and provided in their opposing faces with vertical grooves to receive and guide the heads of the type-bars. The rear plate, $a$, is provided, as shown in Figs. 16 and 19, with notches or shoulders $c$, equal in number to the type on the individual bars, to engage sustaining-dogs on the bars, as hereinafter detailed, while the front plate, $a'$, is provided with holes $a^2$, to permit the entrance of stop-pins.

*Type-bars.*—I next provide the series of type bars or bands B, each consisting of a bar or blade having on one edge in relief all the different letters or characters which the machine is designed to print. The characters stand transversely across the bar, so as to be erect when the bar is vertical. The bar may be of steel, brass, or equivalent material, and the characters may be formed integral therewith or secured thereto in any suitable manner—such, for example, as dovetailing or brazing them therein. I prefer the continuous bar in one piece; but a sectional bar or a bar composed of lengths jointed or hinged together after the manner of a chain may be used.

In order to admit of a proper justification of the characters, as hereinafter more fully explained, I construct each bar of a tapered or wedge-like form, so as to present an edge of decreasing width from one end to the other, and arrange the characters on this edge in the order of their width, as plainly shown in Figs. 17 and 18, the narrowest characters being at the narrow end.

For general printing purposes, bars of the tapered form are of great advantage, and they are considered a very important feature of my invention, applicable not only to the present machine, but generally to any and all machines in which movable printing bars or chains are or may be employed. In certain cases, however, where justification is not demanded, I may use in my machine bars which are of uniform width or thickness at the edge from end to end, and it is to be understood that I claim the right to use such bars in connection with the other mechanisms set forth herein.

I construct the printing-bars of any length which the number and size of the characters may demand, and provide a greater or less number of bars, according to the length of the line to be printed at one operation; but for ordinary purposes I recommend the employment of about fifty bars, each with about one hundred characters, comprising upper and lower case letters, numerals, punctuation-marks, &c. Near the upper end each bar is notched or reduced in width at the front and rear edges, as shown at $i$, and is provided on the side of this reduced portion with a flat arched spring, $j$, which serves as an automatic spacing device. The spring may be replaced by equivalent devices, hereinafter described.

To the upper end of each bar I attach a suspending link or ribbon, $d$, the upper end of which is attached to a head-plate, $e$, adapted to slide between and in the grooves of the vertical plates $a\ a'$ of the main frame before mentioned. Each head is provided with a horizontally-sliding dog or detent, $f$, urged rearward by a spring, $g$, and designed to engage in the notches $c$ of the guiding-grooves before alluded to. As seen in Figs. 16, 17, and 19, this dog is provided with a depending arm, $h$, inclined on the rear side, whereby its disengagement is effected, as hereinafter explained. The lower end of each bar is provided with a horizontal sliding pin, $j'$, urged endwise by a spiral spring, $k$. The alternate bars should be without pins, or have their pins urged in the opposite direction from those of the intermediate bars. They are designed to hold the edges of the bars out of line during their end motion, to prevent the characters from catching or binding, as will be further explained.

In addition to the printing-characters, each bar is provided with a raised blank surface, $b$, to sustain the paper or other material when the bar is used for spacing purposes and not printing. It will be perceived that this spacing-surface is located at an intermediate point in the length of the bar, between two of the characters. The advantage of this location lies in the fact that it permits the space to be made of a width greater than that of the narrowest but less than that of the widest characters, such being the width demanded by the rules accepted in the art.

Having provided the series of type-bars with their links and heads, I suspend them side by side in the upright part of the main frame, as shown in Figs. 2, 3, 15, 16, 19, and 24, seating their heads $e$ in the grooves of the stationary plates $a\ a'$, so that each bar may slide upward and downward independently of its companions, in order to bring every selected letter on its face at the proper horizontal line for giving an impression. It will be noted that the bars all present their characters in the same direction, so that by properly adjusting them the selected characters may be presented in one horizontal line—that is to say, a line composed of a number of characters, one on each bar.

For the purpose of sustaining the bars which descend by gravity until the proper time, and to raise them after the impression is completed to a common line, I employ a vertically-sliding frame or yoke, C, which encircles the entire series of bars, so as to bear loosely beneath their heads $e$, as shown in Figs. 15 and 16, and elsewhere. This frame is fastened to a guiding and sustaining arm, D, which is extended around the plate $a$, and provided with a dovetail rib which slides in a corresponding vertical groove in the main frame. The sustaining-arm is in turn attached to a suspending-chain, E, winding on a pulley, F, secured to a horizontal shaft, G, one end of which is provided with a drum or pulley, H, to which there is attached a chain, I, extending to the upper end of a lever, J, provided with a counter-weight, K, as shown in Figs. 1, 2, 15, 16, and 38. The weight helps to raise the frame or yoke C, and thus to lift all the type-bars to the starting-point. When the frame C is lowered, all the bars are permitted to descend until they are individually arrested by the stop devices. The movement of the lever J to raise and lower the bars is effected at the proper times by a cam-wheel, L, engaging a roller on the lever, as shown in Fig. 38, and carried by the main shaft M of the machine.

Referring again to the frame C, which suspends the bars, it will be perceived in Fig. 16 that when the head of a bar rests on the frame the rear edge of the latter acts against the dog or detent $f$ of the head and holds the same inward out of action, so that the head may slide freely up and down. When, however, the descent of the head is arrested by the stops, to be described, the frame C, continuing its descent, moves away from the dog $f$, which is immediately projected so as to engage one of the shoulders in the stationary plate, as shown in Fig. 19, and thus suspend the head and bar, for the time being, independently of the frame C. This action occurring in connection with each head, it follows that the various bars may be stopped one after another at different heights, while the frame C continues to descend. When the frame rises, it encounters the heads one after another, disengages the dogs $f$, and lifts the bars to the normal position.

*Stop-pin mechanism.*—For the purpose of arresting the respective type-bars at the proper points to bring the designated characters in a common horizontal line, I employ the stop-pins $S^2$, before alluded to, and plainly represented in Figs. 2, 3, 5, 6, 8, 14, 16, and 19. These pins are arranged to slide horizontally forward and backward to and from the type-bars, and are disposed in horizontal and vertical rows. There is a vertical row in front of each type-bar, each pin indicating a particular letter on said bar, and serving when in action to arrest the bar with the corresponding letter in an operative position. All pins in the same horizontal row represent the same letter or character on the different bars. The entire series of stop-pins are mounted in an upright frame, N, which is movable forward and backward to and from the type-bars. In front of this frame there is an upright frame, S, movable horizontally from right to left, and containing the series of adjusting-pins R, hereinafter described, whereby the appropriate stop-pins are pushed backward one at a time, as will be hereinafter explained.

In order that the stop-pins may be adjusted to designate the characters for one line while the type-bars are being used to form the matrix for a preceding line, it is necessary to adopt a construction which will permit the stop-pins to be designated and adjusted by the finger-keys without causing the pins to be placed at once in position to act upon the type-bars. It is for this purpose that the stop-pin frame N is movable forward and backward. At the commencement of operations the stop-pin frame is in its forward position and all of the pins stand in their normal or inactive position in line with each other, as shown in Fig. 5. When the keys and adjusting-pins are actuated, the corresponding stop-pins are thrust backward beyond their companions in the manner represented in Fig. 10, the projection being insufficient, however, to cause them to engage the heads of the type-bars. At the proper time, after a stop-pin has been thus adjusted for each type-bar, the pin-frame N moves bodily to the rear, carrying with it the entire series of pins, until those which were adjusted or projected beyond their fellows extend through and beyond the guide-plate $a$, as represented in Fig. 11, so that their rear ends will engage with the descending type-bars in the manner shown in Fig. 6, thus stopping the various bars at the required points. At a suitable time the pin-frame is moved still farther to the rear. The projected pins, having their shoulders in contact with the plates $a'$, as shown in Fig. 11, are prevented from moving farther backward, and consequently as the frame is moved backward it is caused to slide over the projected pins, which are held at rest, and which are thus brought in line with the remaining pins, as shown in Fig. 12. The forward movement of the frame carries with it all the pins, which are thus restored to their normal positions, leaving the heads of the type-bars free to rise and fall without hinderance therefrom. It is this forward movement of the pins and their restoration to their normal positions while the type-bars remain in the adjusted or printing position that constitutes one of the fundamental features of my system. It is this arrangement which permits me to operate the keys to adjust the stop-pins for printing the second line while the impression is being taken of the first line from the characters previously selected.

As a convenient means of effecting the forward and backward movement of the pin-frame N, I encircle the same by a second rectangular frame, O, arranged to slide vertically in grooves or bearings in its sides. I provide this frame in each of its four corners with a vertical slot, $p$, to receive the end of a horizontal stud or support, $o$, formed or fixed on the main frame. Each of the slots in the frame O has its side walls or faces formed, as shown in Figs. 9 to 13, with inwardly-projecting lips or flanges $r$, portions of which are vertical, while the intervening portions are inclined from front to rear, arranged to engage in notches in the sides of the supporting-studs $o$. As a result of this arrangement the vertical movement of the frame O, by reason of the engagement of the inclined lips $r$ in the fixed studs $o$, causes the frame O to be shifted backward and forward, its movement being accompanied by a like forward and backward motion of the pin-frame N. Thus it is that by raising and lowering the frame O the pin-frame is moved backward and forward.

In order that the operator may adjust the frame O at will to correct mistakes or for other purposes, I apply a hand-lever engaging projections on the frame, the end of the lever being in such position as to be conveniently manipulated by the attendant. The automatic action of the pin-frame at the proper time to restore the stop-pins to their normal position is effected, as shown more particularly in Fig. 14, by means of a lever, $t'$, connected at one end by a link to the cam-frame O, provided at the opposite end with a counter-weight, $u'$. This lever is connected by a rod, $v'$, to an arm, $w'$, having a pin or stud, $x'$, engaging in a grooved cam-wheel, $y'$, the rotation of which imparts motion through the intermediate parts to the cam-frame O, causing the same to rise and fall, and thus shift the pin-frame N forward and backward, as before explained in detail. The arm $w'$, on which the cam acts, is mounted at one end on a pivot or rock-shaft, $z'$, and is jointed near its middle, as shown at $b^2$, the two parts being connected by a spring, $c^2$, which tends to hold them in line. This elastic jointed connection permits the parts to yield when the cam-frame is to be actuated by the hand-lever for correcting mistakes, &c., in the manner before described.

While I recommend the use of the frame O, with its inclined lips, as a satisfactory device for moving the pin-frame forward and backward, it is to be distinctly understood that any equivalent adjusting mechanism may be employed for the purpose without passing beyond the limits of my invention.

*Adjusting-pins and finger-keys.* Passing now to the means for forcing the appropriate stop-pins backward, attention is particularly directed to Figs. 1, 3, 4, 5, and 6, in which R represents the horizontal adjusting-pins, arranged in a single vertical line or row in a supporting-frame, S, which is arranged to slide horizontally to and fro on guides or rails T, as shown in Fig. 4. This lateral adjustment admits of the entire series of adjusting-pins being moved from left to right, as before explained, so that they may be brought in position to act upon the stop-pins of the respective type-bars. This will be plainly understood on reference to Fig. 3.

To effect the backward movement of the adjusting-pins, I mount in the front of the main frame, as represented in Figs. 1, 2, 5, and 6, a series of horizontal crank-shafts, U, the crank portions of which extend across the entire series of stop-pins in position to act upon the respective adjusting-pins. The rocking of either shaft will cause the forward movement of the corresponding adjusting-pin, and this whether the pin be in a position to act upon the stop-pins of the first, second, or any other type-bar. The mode of action will be readily understood on reference to Fig. 6. The operation of the crank forces the pin R backward, and this pin in turn forces back the stop-pin S², so that its end will encounter the descending head of the corresponding type-bar. Spiral springs $s$, attached at one end to the adjusting-pins, as shown in Fig. 5, serve to urge said pins forward and turn the crank-shafts to their normal positions when released. Each crank-shaft is provided with a projecting arm, P, the outer end of which is connected by a rod, $u$, with a corresponding finger key or lever, V. These keys are arranged in banks or series, as plainly represented in the several figures. It will be observed that there is a key for each crank-shaft and a crank-shaft for each adjusting-pin, so that the depression of any one key will always effect the movement of the same adjusting-pin. For example, the depression of the A-key will move a given adjusting-pin, and the latter will in turn move a stop-pin to arrest one or another of the type-bars at A. In order to shift the adjusting-pins laterally from the stop-pins of one type-bar to those of another, I attach to the frame S a weighted cord, $w$, extending from a pulley, $x$, as shown in Fig. 4.

For the purpose of causing the frame S to move step by step after the action of the successive keys, I provide it with a horizontal rack-bar, $y$, engaged by a pinion, $z$, the shaft of which bears an escape-wheel, $b'$, connected thereto by a pawl and ratchet, as shown in Figs. 3, 4, 36, and 37. This escape-wheel is engaged by a vibrating detent, $c'$, having two shoulders, $d'$ and $e'$. Each arm of the wheel first engages the shoulder $d'$. When the detent is slightly lowered, the arm escapes the first shoulder, and, turning very slightly, encounters the second shoulder. After the disengagement of the second shoulder, which is effected by the elevation of the detent, so that the arm is permitted to pass below the shoulder $e'$ and behind the shoulder $d'$, the detent is permitted to turn until the next arm encounters the shoulder $d'$, the effect of this rotation being to allow the pinion $z$ to turn a sufficient distance to move the rack-bar and the frame S to the right until the adjusting pins are moved from one row of stop-pins to the next. Thus it will be perceived that at each action of the escapement the adjusting-pins advance from the position in which they act to effect the stoppage of one type-bar to the position in which they act to effect the stoppage of the next type-bar. The detent is carried, as shown in Fig. 37, by a rock-shaft, $e^5$, which is urged in one direction by a spiral spring, $f'$, and turned in the opposite direction by an arm, $g'$, attached to a rod, $h'$, which is extended downward and connected with devices operated by the entire series of finger-keys, so that the rise of each key after its operation will be followed by the action of the escapement and the movement of the adjusting-pins to the right.

The arrangement of devices for thus operating the escapement from the keys is plainly represented in Fig. 5, in which it will be seen that the rod $h'$ is connected to an arm on a rock-shaft, $i'$, located beneath the keys. This shaft has two or more arms bearing a rod, $j'$, which is acted upon by the lower keys. The upper keys act on a rod, $k'$, carried by arms $l'$ on a rock-shaft, $m'$, which has an arm connected directly to the escapement-rod $h'$, as shown. The action of any key in the series will consequently operate the escapement. The arrangement of the parts so that the action of the escapement and the lateral movement of the adjusting-pins occur during the rise of the finger-keys is important, in that it avoids the danger which would otherwise arise of the adjusting-pins being driven backward by the stop-pins while shifting from one to another.

From the foregoing description it will be seen that the depression of the successive keys results in the projection of stop-pins for the successive type-bars, one pin for each bar, until the pins have been adjusted to stop the entire series of bars in position for printing in one line the designated characters. After the frame S has completed its movement to the right, it is returned to the left automatically by an arm, W, carried by a horizontal rock-shaft, as in Figs. 2, 3, and 4, and acting at its upper end against an adjustable block, $m'$, on the rack-bar $y$. The returning-arm is actuated by an arm, $n'$, attached to its shaft $o'$, and engaging in a cam-wheel, $p'$, (plainly shown in Figs. 2 and 4,) driven as hereinafter explained.

*Indicating and alarm mechanism.* In order that the proper arrangement or justification of each line of characters may take place, it is necessary that the operator shall at all times know the width of the unfilled space, or, in other words, know what portion of the line-space is occupied by the characters already selected. Now, inasmuch as the characters are of different widths and the bars also of different widths at the points where the various characters are carried thereon, it is manifest that the mere indication of the number of bars selected or of the number of keys actuated is insufficient to the end in view, since the selection of a given number of narrow characters would manifestly leave a greater space to be filled than the selection of the same number of wide characters. I therefore provide mechanism which is advanced by the selection of each character a distance corresponding to the width of that particular character, be it greater or less, and which at all times presents the total value in width of the selected characters, as well as the width remaining to be filled in order to complete the line. This mechanism may be actuated from various moving parts of the organization; but I prefer, as the most simple plan known to me at the present time, to actuate it by means of the adjusting-pins, as plainly shown in Figs. 3, 5, 20, 21, 22, and 23.

In the frame S, which carries the adjusting-pins, as explained, I mount in suitable guides a vertically-movable bar, Y, containing a series of holes or slots, through which the rear ends of the adjusting-pins slide. Each pin has an incline or cam surface, $r'$, formed on the upper rear edge, so that when it is forced back by the finger-key to set the stop-pin this incline will lift the bar Y. The cam or incline of each pin has a rise or "lift" proportioned to the width of the character or letter which the pin causes to be printed. To illustrate: The pin which is connected with the i-key has but a slight lift, while that of m has a relatively great lift. Thus the action of the various pins and keys causes the bar Y to be lifted different distances. As each pin is released it is drawn forward by its spring, and the bar Y descends. Its descent may depend upon gravity alone, or a spring, $s'$, may be applied, as in Figs. 20 and 21, to urge it down.

To the bar Y, I pivot a dog or arm, $e''$, which encircles and serves to raise step by step a vertical rod, $f''$, sliding in guides in the frame S, and provided with an arm or pointer, $g''$, which traverses the surface of a fixed vertical scale, $h''$, which stands at the front of the machine, in view of the operator. As the indicator rod rises it is held by a dog, $i''$, pivoted to the frame. The lifting-dog $e''$ and the locking-dog $i''$ consist each of an arm perforated for the passage of the rod and urged downward by means of springs $j''$, so that they engage frictionally with the rod.

It will be seen that in the above combination the action of each key and its corresponding adjusting-pin is followed by an elevation of the pointer $g''$ a greater or less distance, according to the width of the letter represented by the key, the value of each letter in width being added to the total as its key is actuated, the pointer indicating at all times the aggregate width of the selected characters and also the width of the space required to complete the line—that is to say, of the unoccupied space to be filled—so that the operator may know when to stop the addition of characters, when to divide the words, and, generally, what course to pursue in order to complete the line in accordance with the accepted typographic and orthographic rules. As the indicator-rod completes its ascent, the line being complete, the dogs $e''$ and $i''$ are automatically lifted and disengaged by arms $k''$, carried by the bell-striker $n^2$, below described, whereby the indicator is permitted to descend to its original position preparatory to the selection of the characters for another line. The descent of the indicator is governed by a spring, $l''$, connected therewith, as shown.

*Alarm.*—In most cases it is advisable to provide automatic devices to give audible notice when there remains but a given space to fill at the end of the line. To this end I mount on the frame S a bell, $m''$, and a pivoted spring-actuated striker, $n''$, bearing at its heel two pins, $k^2$. A pivoted stop, $o''$, urged in one direction by a spring, acts automatically to hold the striker back when it is lifted from the bell. As the frame S moves to the left and the indicator-rod descends preparatory to the beginning of a line, it encounters the heel end of the striker and lifts the same until the stop engages. At the proper time previous to the completion of the line, an arm, $a^6$, on the lower end of the indicator-rod trips the stop and causes the bell to sound.

The striker is set in position to be operated by means of a fixed adjustable arm, $a^8$, secured to the main frame, as represented in Fig. 4, with one end in position to act on the striker or a pin thereon as the adjusting-pin frame completes its movement.

*Secondary indicator.*—As it may be sometimes desirable to know how many type-bars have been designated for use in printing a line, I provide the lower end of the frame S with a pointer, $p''$, which travels laterally with the frame over the face of a fixed scale, $q''$, suitably graduated. This indication is independent of the indication of the space occupied by the selected characters, and is not an essential or necessary feature.

*Clamping mechanisms.*—Having described above the means whereby the type-bars are placed in position to bring the selected characters in line, I will now describe the means for clamping or locking the bars firmly and accurately in line during the taking of the impression therefrom.

Referring to Figs. 2, 24, 25, 26, and 34, B' represents a horizontal clamping-bar or anvil extending across the rear edges of the entire series of printing-bars, and connected at its ends by pitmen $s^2$ with eccentrics $t^2$ on a rock-shaft, $t^3$, mounted on fixed bearings on the main frame, so that when the shaft is rocked in the proper direction the clamping bar will be urged forcibly against the backs of the bars to give support thereto and keep them in line. On the opposite side of the bars—that is, in front of the edges bearing characters—I mount a second clamp composed of two jaws or bars, C' C$^2$, connected by a horizontal pivot, $u^2$, seated in a plate, $w^2$, which slides on fixed horizontal guides, so as to carry the jaws to and from the edges of the bars. These jaws may be closed together, after the manner of a pair of tongs, above and below the selected characters, so as to embrace the characters between them, as shown in Fig. 26, whereby the characters are maintained in exact alignment vertically. The sliding motion of their support also permits the jaws to be moved forward against the edges of the bars, so as to force and hold them securely against the rear clamping-bar or anvil. This action is of the highest importance, in that it insures the holding of the faces of the type-characters in a common plane, so that they will produce in the matrix impressions of absolutely uniform depth. The clamping-jaws C' C² are moved forward and backward by links $a^3$, which connect their sliding support with eccentrics $t^2$ on the shaft which actuates the rear clamp, B'. The closing action of the jaws C' C² is secured by providing them with rearwardly-extending arms, which bear on opposite sides of eccentrics $c^3$ on the shaft which carries the other eccentrics, as shown in Figs. 24, 25, and 26. Before leaving the clamps C' C², it is to be noted that they are so formed as to leave between them an open space, $d^4$, through which the line of selected characters is exposed to the entrance of the paper and the beating devices.

In addition to the clamps above mentioned, which only hold the bars against motion in edgewise and endwise directions, it is necessary to bind them firmly together side by side. This is done by two horizontally-sliding clamps, D', acting in opposite directions against the outside type-bars, as in Fig. 24. The active ends of these clamps are forked or notched in such manner that, although they will act against the body portions of the bars, they will straddle the reduced necks of such bars as may be lowered beyond the printing position, and thus act against the outermost bar which is in position to print; consequently any bars which may be situated at either end of the line, and which are not called into action, will be free from the lateral compression—a fact which is important, for reasons hereinafter stated. The lateral clamps D' are actuated, as shown in Figs. 3, 28, and 29, by links connecting them with vibrating arms $e^3$, each of which is secured on a rock-shaft, $f^3$, provided with a second arm, $g^3$, bearing a stud or roller which enters a cam-groove in the periphery of a wheel, $h^3$. The two cam-wheels are carried on a transverse shaft, M, and are so constructed and adjusted that they move two clamps, D', to and from each other at the same instant, or practically so.

In order that the clamps D' may act with a yielding pressure on the bars, and that they may adapt themselves to the varying width of the bars as adjusted between them, their actuating arms $e^3$ are jointed, and provided each with a stop-screw, $j^3$, which limits the motion of the free end in one direction, and with a spring, $k^3$, which urges the end in the opposite direction, as seen in Fig. 28. This construction provides in effect an elastic knuckle-joint.

In practical operations I have found it necessary to limit positively the inward motion of the lateral clamps D' and to provide for changing the point of stoppage. To this end I adopt the details shown in Figs. 28 to 32. Each clamp is grooved on the under side to slide on dovetail guides on the frame.

The actuating-link, instead of being attached directly to the clamp, is attached to a block, $l^3$, secured in turn to the clamp by two screws, one of which, $m^3$, is extended below the slide, so as to enter a groove, $n^3$, in the dovetail guide beneath. The end of the screw slides to and fro in the groove, and, encountering the end of the same, acts as the stop to limit the inward movement of the clamp. The clamp is provided, as shown in Fig. 32, with a series of holes to admit the screws, to admit of the clamp being adjusted endwise with respect to its actuating-lever. This permits the slide to be set to move inward a greater or less distance, according to the length of the lines to be printed and to the number of bars commonly called into action.

*Beating mechanism.*—The next step after the clamping of the adjusted bars is the beating or forming of the papier-maché or equivalent substance upon the selected and assembled characters in such manner as to insure a sharp, clean, and uniform matrix. For this purpose I make use of two vibrating beaters or hammers, E' and F', as shown in Fig. 34, each carried at the ends of swinging arms, and each adapted to act through the space between the clamps C' C² against the face of the type. The upper beater is armed with bristles or other yielding elastic or semi-elastic substance adapted to force the material down into and around the details of the type, while the lower beater is of metal or similar material adapted to solidify and give uniformity to the matrix. The action of the upper beater is secured by providing its rock-shaft $n^3$ with an arm connected by a pitman, $o^3$, to a rapidly-driven crank, $p^3$, the revolution of which causes the beater to strike downward quickly and forcibly against the material on the type. The lower beater is secured to a rock-shaft, $q^3$, having an arm connected by a rod to an arm, $r^3$, which is mounted loosely on the shaft of the upper beater, and actuated in an upward direction by a strong spring. $s^3$, and in a downward direction by a wheel, $t^6$, having a circular periphery provided with three notches, more or less. The upper beater first acts and then rises out of the way. During this time the arm $r^3$ bears on the smooth surface of the wheel $t^6$, and is held back so as to keep the lower beater out of action. At the proper instant the notches of the wheel pass the arm, which, dropping into the successive notches under the influence of the spring, causes the lower beater to strike as many times as there are notches. The upper end of the spring is secured to a screw which is adjustable by a thumb nut, so that the force of the blows delivered by the lower striker may be varied.

The paper or other material is prepared in the form of a long narrow strip, band, or ribbon, G', which is passed through the machine from a reel on one side to a reel or take-up device on the other across the front edges of the series of type-bars, as shown in Figs. 3 and 34. The take-up reel or roll may be actuated intermittingly by a pawl, $w^3$, carried by a crank-pin on a horizontal wheel; or it may be actuated by automatic mechanism of any other appropriate form, or by hand. These devices, which may be readily provided by an ordinary mechanic, are considered unimportant.

*Driving-gear.*—The operative parts hereinbefore described may be actuated by driving mechanism of any appropriate character adapted to give them motion at the proper times; but I prefer to employ the organization shown in the drawings, which I will now describe. The main driving-pulley H' is designed to receive a belt from an engine or other motor constantly in motion. It is mounted loosely, as shown in Figs. 2, 3, and 33, in the end of a shaft, I', having a fixed arm provided with a sliding clutch-pin, J', to engage the pulley and lock the same fast to the shaft when the devices for moving the bars, clamps, and beaters are to be set in action. The pin J' is connected with a rod, K', which slides centrally through the driving-shaft, and has its inner end swiveled to the end of a lever, L', urged to the left by a spring, $v^3$, and bearing a roller which enters a cam-groove in the periphery of a controlling-wheel, M', as shown in Figs. 33 and 35. The groove is of such form that the revolution of the wheel causes the lever to hold the clutch-pin J' in action for the proper time, the pin being first engaged by hand to initiate the operation, as will presently appear. At one point in its length the groove has an offset, $w^3$. When this point comes opposite the roller, the lever L' is permitted to move to the left under the influence of its spring, and thus the driving-pulley H' is automatically uncoupled. The inner end of the driving-shaft carries a sliding half-clutch, $x^3$, fixed against rotation thereon and connected to the swivel end of the lever L', whereby it is caused to engage and disengage its counterpart $y^3$, fixed on the end of the crank shaft which drives the lower beater. The cam-groove which controls the clutching-lever is of such shape and the parts so adjusted that the first movement of the lever to engage the driving-wheel is insufficient to engage the clutch of the beater-shaft, which remains idle for the time being, while the driving-shaft is in motion. At the proper time, however, a portion of the cam-groove, which is carried farther to the left than the remainder, causes the lever to move still farther to the right, and thus couple the beater-shaft to the driving-shaft, so as to actuate the beater, the parts remaining in engagement until the completion of the matrix and the rise of the type-bars to their normal positions, when the wheel M' automatically disconnects both the beater-shaft and the main driving-shaft from the driving-pulley.

As before mentioned, the starting of the mechanism is done by hand at the pleasure of the operator. To this end the rock-shaft, which carries the clutching lever L', is provided, as in Figs. 2, 3, and 33, with a horizontal arm, $g^4$, connected by a rod, $h^4$, to a special finger-key, $i^4$, known as the "starting-key." The depression of this key causes the lever L' to engage the clutch, which causes the cam-wheel to turn in such manner as to hold the lever and retain the clutch in engagement until the various operations have been performed.

The main driving-shaft I is provided with a worm or thread, $z^3$, which remains constantly in engagement with a horizontal worm-wheel, $a^4$, on a vertical shaft, $b^4$, which also carries, as in Figs. 2, 3, and 34, a beveled gear-wheel, $c^4$, to which the feed-pawl is journaled. This gear drives a vertical gear, $d^4$, on the horizontal shaft M, which also carries the wheel $t^6$, for driving the lower beater, as before explained. This horizontal shaft also carries the cam-wheel $p'$, through which the arm W is actuated to restore the adjusting-pin frame to its starting-point at the left of the machine. The same shaft also carries the two cam-wheels for communicating motion to the lateral clamps D, as heretofore explained, and shown in Figs. 2, 3, 28 and 29. This shaft also carries the cam-wheel $f^4$, having, as in Figs. 2 and 26, a cam-groove in its side face to engage a roller or stud on a vibrating lever, $g^3$, the lower end of which is provided with gear-teeth driving a pinion, $h^4$, on a horizontal shaft, $t^3$, which carries the eccentrics to operate the front and rear clamps. The shaft M further carries the cam $y'$, by which the front and rear movements of the stop-pin frame are effected, and the cam-wheel by which the large lever J is vibrated to raise and lower the type-bars.

*Operation of the machine.*—Assume that a matrix has been completed, the stop-pins restored to their normal positions, the entire series of type-bars lifted to their uppermost position, the adjusting-pin frame moved to the left, and the clutch disengaged. The operator depresses the finger-key representing the first letter to be printed. The effect is to operate the corresponding rock-shaft and force backward the appropriate adjusting-pin, which will in turn force backward the appropriate stop-pin of the first type-bar—that is to say, the type-bar at the left of the series. As the operator relieves the finger-key from pressure the rock-shaft and the adjusting-pin are returned to their normal positions, and at the same instant the frame S, which carries the adjusting-pins, moves to the right a sufficient distance to present the adjusting pins opposite the stop-pins of the second type-bar. The key representing the second letter to be printed being now depressed, its rock-shaft causes an adjusting-pin to push backward the appropriate stop-pin of the second type-bar, and so on repeatedly, the keys being operated one after another until stop-pins have been set for all the bars which are to be used. During this operation the indicator $g^2$ advances upward over the scale, informing the operator of the aggregate width occupied by the characters selected, and also the amount of space remaining to be filled. Those bars the stop-pins of which are not actuated continue their descent until the spacing-springs at their upper ends are brought into position at the printing-line. Where spaces are to be provided at either end or in the middle of the lines, the operator depresses the spacing-key, the effect of which is to actuate the stop-pins, which arrest the bars in position to present their blank or spacing surfaces $b$ in line with the selected characters, these arrested spacing-surfaces serving, as before mentioned, to prevent the material from being beaten downward between the adjacent type-bars. Having designated or selected by the manipulation of the keys all the characters necessary to form a line, and having filled the line, if required, by the manipulation of the spacing-key or paragraph-key a suitable number of times, the operator next depresses the starting-key, holding the same until the cam mechanism locks the driving-clutch in engagement. The stop-pin frame now moves backward, so that the designated or projected pins may be brought in the path of the heads of the type-bars. At this stage of the operation there will be a stop-pin projected in front of each type-bar. The frame or yoke C, upon which the heads of the type-bars are supported, now moves steadily downward, allowing the entire series of bars to descend. In consequence of its descent each type-bar is arrested at the appropriate point by its head coming in contact with the stop-pin, the various bars being stopped at different points, according to the letters which they are to print, as plainly represented in Fig. 16. As each bar is stopped the supporting-yoke C descends therefrom, and the sliding dog on the head of the bar enters a hole in the back plate, $a$, so as to support the bar independently of the stop-pin. After all the bars in the series have been stopped with their designated characters in line at the printing-point, the stop-pin frame moves farther backward and immediately moves forward again, thus restoring the stop-pins to their normal positions in line with each other, and carrying them forward out of engagement with the heads of the type-bars. This disconnection and readjustment of the pins enables the operator to commence the manipulation of the keys to adjust pins for the printing of the next line while the various automatic operations of the machine are being carried on to complete the first line. Immediately after the bars are stopped in their proper place the clamps engage the bars from the front and rear and from the sides, as before explained, binding them firmly together. The upper beater now delivers a number of blows in rapid succession to drive the matrix material down upon the face of the characters, after which the lower beater acts to complete the matrix. The clamps are now released, the matrix-strip advanced to present a new surface, and the entire series of bars lifted to their normal positions by the ascent of the heads $e$. Immediately after the restoration of the bars their descent may be again commenced, as the necessary stop-pins have in the meantime been adjusted to the second line.

*Modifications and equivalents.*—While I have described in detail, and prefer to use in most cases, type-bars consisting each of a continuous metal blade in one piece, it is to be understood that these bars may be replaced in certain cases by flexible bars jointed after the manner of a chain, as in Fig. 39, or by wheels or disks arranged side by side, as in Fig. 40, and combined with mechanism to effect their rotation in order to align the designated characters, as will more fully appear on reference to the machine represented in my application for Letters Patent filed on the 27th day of June, 1883, No. 99,328. The stop-pins, adjusting-pins, keys, beating mechanism, clamping devices, and indicating mechanism may each and all be used in combination with the disks or the flexible bars in the same manner and, so far as designation and alignment of the characters are concerned, with the same effect as when used with the rigid bars. The disks will not permit the line of characters to be justified in the manner allowable with the bars; but where justification or accuracy of spacing is not demanded the disks may be used.

No claim is made herein to the series of disks, which are in themselves old. They are represented herein to show the manner in which the stop-pins and adjusting-pins may be used therewith, or, in other words, to illustrate more fully the applications which may be made of the series of stop-pins and adjusting-pins.

Various details of construction used in connection with the rotary disks to effect their automatic operation peculiar to machines in which they are used and foreign to the present invention will appear in my prior application above alluded to.

It is to be further understood that I propose to construct machines in which the characters will be depressed or formed in the bars in intaglio, so that after the designated characters are fixed in line a printing-bar or printing-surface may be formed directly therefrom by casting molten metal or forcing elastic material therein. In this system the adjusted bars will form the matrix, thus avoiding the use of paper or other material, and producing the printing-surface directly in the machine. I do not claim these bars *per se* in this patent; but as combined with the keys, clamps, indicators, and intermediate devices they will be the equivalents of the bars herein shown, and will fall within the scope of the combination claims herein made.

The bars themselves and such devices and combinations of devices as are specially designed for use therewith constitute the subject-matter of a separate application filed August 30, 1884, No. 141,851.

Having thus described my invention, what I claim is—

1. A metal bar tapered continuously from end to end and provided with characters or letters in its tapered edge.

2. A series of independently-reciprocating parallel bars, each consisting of a single piece of metal tapered continuously from end to end and provided at its edge with a series of single characters in position to be read transversely of the bar.

3. The type-bar having the series of letters or characters on its edge and the automatic spacing device on its side.

4. The type-bar, as described, provided with the line of single characters at its edge and the spring $j$ at its side.

5. The continuous type-bar having the characters formed on its edge and the reduced portion or neck $i$ near one end.

6. A series of parallel independent bars movable independently in the direction of their length, and each provided with a series of letters or characters, in combination with stop devices, substantially as described, arranged in rows in front of the respective bars, whereby the various bars may be stopped at different points to bring different letters in line.

7. The reciprocating type-bar provided with type at its edge, combined with a series of stop-pins acting directly to arrest the bar at different points, adjusting-pins to set the stop-pins, and finger-keys to actuate the adjusting-pins, substantially as described.

8. The series of type-bars, the stop-pins arranged in rows adjacent to the respective bars, the adjusting-pins, and a laterally-movable support for the latter, combined substantially as described, whereby the adjusting-pins may be placed in position to actuate the stop-pins of the different printing-bars in succession.

9. The type-bars, the stop-pins acting directly upon the bars, the adjusting-pins, the rock-shafts to actuate the adjusting-pins, and the finger-keys to actuate the respective shafts, combined substantially as described and shown.

10. The type-bars, the stop-pins, and the frame to carry said pins, movable in a forward and backward direction, combined substantially as described, whereby the projected pins may be restored to their normal positions and disconnected from the bars.

11. In combination with a guide or support therefor, a type bar or carrier, a series of independent stops to arrest the motion of the bar at different points, and a dog or detent movable with the bar, to hold the same after the stop is disengaged.

12. In combination with a movable type-bar, a series of stop-pins arranged to slide to and from the same in a fixed support, and a dog or detent movable with the bar and arranged to engage a fixed plate, whereby the bar may be maintained in the position in which it is stopped after the stop-pin ceases to act thereon.

13. In combination with the independent type-bars, the stop-pins, the adjusting-pins, the frame sustaining the stop-pins, and mechanism, substantially as described, to impart three motions to the pin-frame, viz: first, a backward movement to place the previously-projected pins in position to stop the bars; second, a farther backward motion to restore all the pins to their normal positions in the frame; and, third, a forward motion to disconnect the pins from the bars and place them in position to begin operations.

14. The series of independently-reciprocating parallel type-bars with type at their edges, combined with clamps acting laterally to bind them together, and mechanism, substantially as described, for actuating the clamps.

15. A series of parallel independently-reciprocating bars or carriers, each having a series of type on its edge, in combination with two clamps extending across the edges of the series, and mechanism, substantially as described, to approximate said clamps, whereby they are caused to confine the dies and bring the type to a common plane.

16. In combination with the independently-movable type bars or carriers, the clamp extending across the back of the series, the two clamps extending across the front of the series, and operating devices, substantially as described, for approximating the front and rear clamps, and also approximating the front clamps.

17. The series of independently-movable type bars or carriers, each provided with a series of type at the edge, in combination with the front clamps to engage the upper and lower edges of the selected and aligned characters, and mechanism, substantially as described, to close the clamps upon the type and also urge them toward the edges of the bars.

18. In combination with the movable type bars or carriers, the clamps $C'$ $C^2$, constructed as described, to act on the front edges of the bars above and below the line of characters and to expose the faces of the characters between them.

19. In combination with the longitudinally-movable type bars and their suspending devices, substantially as described, means, substantially as described, to hold the bars edgewise out of line, whereby the projecting characters in the edges of the respective bars are prevented from encountering each other.

20. In combination with the guiding-plates $a$ $a'$, the series of type-bars and the spring-actuated pins mounted in the lower ends of the bars and arranged to throw the bars edgewise out of line.

21. In combination with the body portion of the type-bars, or bars proper, the suspending-links, the heads attached to said links, and the grooved guide-plates in which the heads slide.

22. In combination with the guide-plates and the vertically-sliding heads therein, the type-bars suspended from the heads, as described, to hang with their adjacent edges out of line.

23. In combination with the type bars or carriers, a beater to force the blanks thereon, and operating mechanism, substantially as described, to cause rapidly-succeeding actions of said beater, whereby the blank is gradually adapted to the surface of the type.

24. In combination with the series of type-bars, the two beaters, and mechanism, substantially as described, to actuate them alternately.

25. In a machine for taking impressions from type, and in combination with a series of movable type-bars, a beater of soft material, a beater of hard material, and mechanism, substantially as described, to actuate said beaters successively.

26. In combination with the type bars or carriers, the swinging beater F' and the pitman and crank connected with and driven by the operative parts of the machine, substantially as described and shown.

27. In combination with the type-bars, the beater F', the arm $r^3$, connected therewith, the spring $s^3$, and the notched wheel $t^3$.

28. In combination with the type-bars having the reduced ends or necks, a lateral clamp having a forked or divided end to straddle the necks of those bars which are not in action, as described.

29. In combination with the type-bars and the lateral clamps, the actuating-levers with jointed yielding ends and the cam for operating said levers.

30. The type-bars, the lateral clamp, the arm to actuate the clamp, and the adjustable connection between the arm and clamp, whereby the clamp may be adjusted to move inward a greater or less distance, according to the length of the lines to be printed.

31. The combination of the type and space bars, the finger-keys, the intermediate mechanism, substantially as described, to align the designated characters, and the indicating mechanism, substantially as described, actuated by the finger-keys, to indicate the aggregate width of the designated characters in advance of their assemblage, whereby the attendant is enabled to determine upon the necessary designation of the spaces.

32. The combination, substantially as hereinbefore set forth, of the type-bars, the stop-pins, the adjusting-pins, and the indicating mechanism, substantially as described, actuated by the adjusting-pins.

33. In combination with the series of type-bars, the indicating mechanism, substantially as described, the stop-pins, and the adjusting-pins, to cause the stoppage of the bars at different points, each pin representing a letter or character, and provided with an inclined surface proportioned to the width of the character to actuate the indicating mechanism.

34. In combination with a series of independently movable type-bars diminishing in width from one end toward the other, a series of finger-keys, intermediate mechanism, substantially as described, whereby the keys are caused to stop the bars at different points, and thus present their designated characters in a common line, and the indicating mechanism, substantially as described, to show the aggregate width of the bars at the points where the designated characters are carried thereon.

35. In combination with the type-bars and the lateral clamp, the guide therefor, the adjustable stop to limit the motion of the clamp toward the bars, and the yielding arm to actuate the clamp.

36. The pendent type-bars having the heads thereon, in combination with the locking-dogs in said heads, and the notched guide-plate to receive and hold the dogs, whereby the bars may be sustained at different elevations.

37. The series of type-bars arranged to slide independently in a longitudinal direction, and provided with heads, in combination with the vertically-movable frame adapted to act beneath the heads, whereby the bars may be raised and lowered in unison and permitted to stop independently in their descent at different points.

38. The independently-movable type-bars and the locking dogs or detents carried thereby, in combination with the guide $a\ a'$, provided with shoulders or notches to engage the dogs, and a vertically-movable head or yoke, C, whereby the bars are raised and lowered and their dogs automatically actuated, as described, whereby the respective bars are permitted to stop, and are automatically suspended at different points when descending with the head, but lifted to a common elevation as the head ascends.

39. The sliding pins having inclines thereon, in combination with the bar Y, the indicator-rod, the intermediate lifting-dog, $e^2$, and the locking-dog $i^2$.

40. The combination, substantially as described and shown, of the finger-keys representing characters of different widths, the indicator connected therewith to show the aggregate width of the designated characters, and the alarm mechanism having its trip $o^2$ arranged to be actuated by the indicator-rod $f^2$, whereby said rod is caused to serve a double purpose.

41. In combination with the finger-keys representing characters of different widths, th smooth indicator-rod, the friction-dogs co-operating therewith, and devices, substantially such as shown, for imparting variable movements to one of said dogs from the respective keys, whereby characters of any width may be employed and the aggregate width of the designated characters accurately indicated.

42. In combination with the type-bars and stop-pins and the adjusting-pin frame movable laterally from one bar to another, the indicator or counting device $p^2\ q^2$, to show the number of bars called into action.

43. In combination with the type-bars, the stop-pins, the adjusting-pins, the laterally-movable frame supporting the adjusting-pins, the escapement to control the lateral movement of said frame, the finger-keys, and connections, substantially as described, connecting the respective keys with the corresponding adjusting-pins and the entire series of keys with the escapement, whereby each key is enabled to designate a particular character and also cause the action of the escapement.

44. In a machine for producing matrices from type or dies assembled temporarily in line, the combination of the independent type bars or carriers, each bearing a plurality of characters, the finger-keys representing the respective characters, the stop devices to arrest the movement of the respective bars at proper points, connections, substantially as described, between the keys and stop devices, and a reciprocating suspending-head, C, substantially as described, to advance the type-bars simultaneously after the adjustment of the stop devices.

45. The series of upright gravitating independent type-bars, each bearing a number of characters, the series of stop-pins arranged in line with the bars to engage the individual bars and stop them at different heights, and the lifting-head, whereby the bars are raised and lowered simultaneously, but permitted to stop individually in their descent at different points.

46. The combination, substantially as described and shown, of a longitudinally-reciprocating type bar or carrier bearing a series of characters, with a series of stops corresponding with the respective characters, arranged to engage the bar one at a time and arrest the same with the desired character at the printing-point.

47. In an automatic machine for producing an impression from a line of temporarily-assembled types, the combination of the following elements: the independent type-bars, each bearing a number of characters, the corresponding finger-keys, the intermediate stop mechanism and connections, substantially as described, the mechanism, substantially as described, for advancing the type-bars to the stops, the clamps to confine the bars, the beater to force the blank material against the aligned characters, and the actuating mechanism, substantially as described, for causing the successive and automatic action of the several parts, as described.

48. The combination, substantially as hereinbefore described and shown, of the type-bars and the clamps acting thereon, the beater, and the driving mechanism acting to automatically close the clamps and subsequently actuate the beater.

49. The finger-keys, the adjusting-pins R, actuated thereby, the stop-pins S², the reciprocating type-bars, and the reciprocating lifting-head C, bearing beneath the heads or shoulders of the bars, said parts combined and arranged to operate as described.

50. In a machine for securing impressions from independently-movable bars, each provided with a series of letters or characters, and in combination with said bars, a series of finger-keys representing the respective characters, stop devices and connections, substantially as described, actuated by the respective keys, to arrest the motion of the bars at suitable points to bring the designated characters into line, secondary locking devices, substantially as described, to hold the bars in the position in which they are arrested by the stop devices, and automatic means, substantially as described, whereby the stop-pins are disconnected from the bars and restored to their normal positions, whereby the operator is enabled to actuate the keys and designate the characters for a second line during the time that an impression is being taken from the first line.

51. In a machine for producing impressions from type bars or carriers, each bearing a number of characters, the combination of the said bars, the series of finger-keys, the stop devices and connections, substantially as described, actuated by said keys, to arrest the bars at different points, and thereby align the designated characters, the suspending devices, substantially as described, to retain the bars in their adjusted positions after the disconnection of the stop devices, the beating mechanism, substantially as described, to force the blank material against the aligned type, the mechanism, substantially as described, to restore the stop devices to their original position previous to the restoration of the bars, and the mechanism, substantially as described, to restore the bars after the action of the beater, said members being organized and arranged for joint operation as set forth, whereby the operation of the keys to designate the characters for one line is permitted during the taking of the impression from the preceding line.

52. In combination with a series of independent type-bars arranged to advance in unison, as described, and each bearing a series of characters, a series of finger-keys representing the different characters, intermediate connections and stop devices, substantially as described, acting to arrest the motion of the bars at different points, and automatic mechanism, substantially as described, acting to disconnect the stop devices from the various bars at one operation and restore them to their normal positions.

53. In a machine for producing impressions from type, the combination of a series of parallel bars movable independently in a longitudinal direction, each bar provided on its edge with a series of characters or type, and also provided at a suitable point in its length with a laterally-acting spring or equivalent spacing device, whereby every bar in the series is adapted for use in indenting or for spacing between the bars which are used to indent, as the operator may elect.

OTTMAR MERGENTHALER.

Witnesses:
ABNER GREENLEAF,
JULIEN P. FRIEZ.